United States Patent
Pursifull

(10) Patent No.: US 9,631,587 B2
(45) Date of Patent: Apr. 25, 2017

(54) ASPIRATOR MOTIVE FLOW CONTROL FOR VACUUM GENERATION AND COMPRESSOR BYPASS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/170,047

(22) Filed: Jun. 1, 2016

(65) Prior Publication Data

US 2016/0273498 A1 Sep. 22, 2016

Related U.S. Application Data

(62) Division of application No. 14/066,569, filed on Oct. 29, 2013, now Pat. No. 9,382,882.

(51) Int. Cl.
*B60T 7/12* (2006.01)
*F02M 35/10* (2006.01)
(Continued)

(52) U.S. Cl.
CPC .... *F02M 35/10229* (2013.01); *F02M 25/089* (2013.01); *F02M 35/10019* (2013.01); *F02M 35/10118* (2013.01); *F02M 35/10157* (2013.01); *F02M 35/10163* (2013.01); *F02M 35/10222* (2013.01); *F02M 35/10255* (2013.01); *F02B 33/44* (2013.01); *Y02T 10/144* (2013.01)

(58) Field of Classification Search
CPC .. F02M 35/10229; F02M 25/06; F02B 67/04; F02D 9/02; B60T 13/52
USPC ....... 123/184.21, 184.56; 701/101, 103, 106, 701/114
See application file for complete search history.

(56) References Cited

U.S. PATENT DOCUMENTS 9,328,702 B2  5/2016 Pursifull et al.
2011/0132311 A1  6/2011 Pursifull et al.
(Continued)

OTHER PUBLICATIONS

Anonymous, "A Combined Aspirator With an Integrated Dual Check Valve Assembly," IPCOM No. 000239163, Published Oct. 17, 2014, 2 pages.

*Primary Examiner* — John Kwon
(74) *Attorney, Agent, or Firm* — Julia Voutyras; McCoy Russell LLP

(57) ABSTRACT

Systems and methods are provided for engine systems including a first multiple tap aspirator with a motive inlet coupled to an intake upstream of an air induction system throttle and a mixed flow outlet coupled to an intake manifold, and a second multiple tap aspirator with a motive inlet coupled to the intake upstream of a main throttle and a mixed flow outlet coupled to the intake downstream of the air induction system throttle. During non-boost conditions, intake air may be selectably diverted around a compressor and through the first and/or second aspirator based on desired vacuum generation. During boost conditions, the first and second aspirators may function as compressor bypass valves, and intake air may be selectably directed from downstream of the compressor to upstream of the compressor via the first and/or second aspirator based on a desired compressor bypass flow.

7 Claims, 10 Drawing Sheets

(51) Int. Cl.
*F02M 25/08* (2006.01)
*F02B 33/44* (2006.01)

(56) References Cited

U.S. PATENT DOCUMENTS

| | | |
|---|---|---|
| 2013/0233287 A1 | 9/2013 | Leone |
| 2015/0040852 A1* | 2/2015 | Pursifull .......... F02M 35/10229 123/184.56 |
| 2015/0083094 A1 | 3/2015 | Pursifull |
| 2015/0114348 A1* | 4/2015 | Pursifull .......... F02M 35/10229 123/403 |
| 2015/0114350 A1* | 4/2015 | Pursifull .......... F02M 35/10019 123/445 |
| 2015/0159601 A1* | 6/2015 | Luehrsen ......... F02M 35/10229 123/564 |
| 2015/0204283 A1* | 7/2015 | VanDerWege ... F02M 35/10144 123/445 |

* cited by examiner

BOOST ACTIVE

600

| ASOV A State | ASOV B State | Compressor Bypass Level | Vacuum Generation Level |
|---|---|---|---|
| Closed | Closed | Level 0 (no flow through aspirators A and B) | Level 0 (no vacuum generated by aspirators A and B) |
| Open | Closed | Level 1 (flow through aspirator A only) | Level 1 (vacuum generated by aspirator A only) |
| Closed | Open | Level 2 (flow through aspirator B only) | Level 2 (vacuum generated by aspirator B only) |
| Open | Open | Level 3 (flow through both aspirators) | Level 3 (vacuum generated by both aspirators) |

FIG. 6

BOOST INACTIVE

700

| ASOV A State | ASOV B State | Compressor Bypass Level | Vacuum Generation Level |
|---|---|---|---|
| Closed | Closed | Not Applicable | Level 0 (no vacuum generated by aspirators A and B) |
| Closed | Open | | Level 1 (vacuum generated by aspirator B only) |
| Open | Closed | | Level 2 (vacuum generated by aspirator A only) |
| Open | Open | | Level 3 (vacuum generated by both aspirators) |

FIG. 7

ASPIRATOR MOTIVE FLOW CONTROL FOR VACUUM GENERATION AND COMPRESSOR BYPASS

CROSS REFERENCE TO RELATED APPLICATIONS

The present application is a divisional of U.S. patent application Ser. No. 14/066,569, entitled "ASPIRATOR MOTIVE FLOW CONTROL FOR VACUUM GENERATION AND COMPRESSOR BYPASS," filed on Oct. 29, 2013, the entire contents of which are hereby incorporated by reference for all purposes.

FIELD

The present invention relates to an engine system including aspirators providing both vacuum generation and boost/surge control.

BACKGROUND AND SUMMARY

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor degradation. Such compressor surge may be mitigated by one or more compressor bypass valves (CBVs). The CBVs may recirculate compressed air from the compressor outlet to the compressor inlet, and thus may be arranged in a passage which is coupled to the intake upstream of the compressor and downstream of the compressor in some examples. In some examples, continuous CBVs (CCBVs) may be used, which provide a continuous and continually variable circulation flow from downstream of the compressor to upstream of the compressor. CCBVs may provide boost control and compressor surge avoidance, and may further prevent objectionable audible noise. However, incorporation of such valves can add significant component and operating costs to engine systems.

Engines may also include one or more aspirators may be coupled in an engine system to harness engine airflow for generation of vacuum, for use by various vacuum consumption devices that are actuated using vacuum (e.g., a brake booster). Aspirators (which may alternatively be referred to as ejectors, venturi pumps, jet pumps, and eductors) are passive devices which provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters. While aspirators may generate vacuum at a lower cost and with improved efficiency as compared to electrically-driven or engine-driven vacuum pumps, their use in engine intake systems has traditionally been constrained by both available intake manifold vacuum and maximum throttle bypass flow. Some approaches for addressing this issue involve arranging a valve in series with an aspirator, or incorporating a valve into the structure of an aspirator. Such valves may be referred to as aspirator shut-off valves (ASOVs). An opening amount of the valve is then controlled to control the motive air flow rate through the aspirator, and thereby control an amount of vacuum generated at the aspirator. By controlling the opening amount of the valve, the amount of air flowing through the aspirator and the suction air flow rate can be varied, thereby adjusting vacuum generation as engine operating conditions such as intake manifold pressure change. However, again, adding valves to engine systems which already include various valves serving other purposes (such as CBVs) can add significant component and operating costs.

The inventors herein have recognized that aspirators and corresponding ASOVs may be arranged in an engine system in a configuration which maximizes vacuum generation during boost and non-boost conditions, and which enables the ASOVs to serve as compressor bypass valves controllable to selectably divert flow through each of none, one, and both of the aspirators to regulate boost and/or reduce surge during boost conditions. Accordingly, the technical result achieved by the engine systems described herein includes the use of multiple tap aspirators to serve as compressor bypass valves providing a selectable discrete level of compressor bypass flow while simultaneously generating vacuum for use by various engine vacuum consumers and/or for purging a fuel vapor canister during boost conditions, as well as the use of multiple tap aspirators to provide a selectable discrete level of vacuum generation for use by various engine vacuum consumers and/or for purging a fuel vapor canister during non-boost conditions.

For example, a first aspirator comprising a suction tap in a throat, a suction tap in a diverging cone, and a suction tap in a straight tube downstream of the diverging cone may couple an inlet of the intake passage (e.g., downstream of an air filter) with the intake manifold for vacuum generation during non-boost conditions, while a second aspirator comprising a suction tap in a throat, a suction tap in a diverging cone, and a suction tap in a straight tube downstream of the diverging cone may couple a main throttle inlet (e.g., downstream of a charge air cooler) with a compressor inlet (e.g., downstream of an air induction system throttle) for vacuum generation during boost conditions. Intake air may be selectably diverted around the compressor and through the first and second aspirators based on desired vacuum generation during non-boost conditions and based on desired compressor bypass flow during boost conditions. During non-boost conditions, for example, intake air may be diverted through each of none, one, and both of first and second aspirators based on the desired vacuum generation, whereas during boost conditions, intake air may be diverted through each of none, one, and both of the first and second aspirators based on the desired compressor bypass flow. Accordingly, during boost conditions, the first and/or second aspirator may function as a compressor bypass valve. Due to the particular arrangement of the first and second aspirators within the system, the first aspirator operates in reverse flow when acting as a compressor bypass valve (in that motive flow travels from its mixed flow outlet to its motive inlet), whereas the second aspirator operates in forward flow when acting as a compressor bypass valve (in that motive flow travels from its motive inlet to its mixed flow outlet).

While aspirators each having a single tap or suction port may be used, the inventors herein have recognized that a multiple tap aspirator which includes suction taps in the throat, diverging cone, and straight exit tube of the aspirator may advantageously maximize vacuum generation while enabling a high suction flow rate, in that this placement combines the advantages of throat tap aspirators (e.g., high vacuum generation) with the advantages of aspirators with taps arranged downstream of the throat (e.g., high suction flow). Inclusion of a tap in the exit tube (e.g., a straight, unconstricted tube downstream of the aspirator's diverging cone) advantageously enables fast pull-down of a vacuum source, such as a brake booster. Further, the inventors have recognized that such an aspirator may be powered by vacuum rather than compressed air, and that flow losses which often occur in staged aspirators featuring multiple check valves in the suction flow path may be reduced via a configuration wherein only a single check valve in the path between the source of suction flow and each suction tap of the aspirator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table relating the states of aspirator shut-off valves controlling motive flow through first and second multiple tap aspirators, respectively, with a resulting level of compressor bypass flow and vacuum generation achieved by the aspirators during boost conditions.

FIG. 7 shows a table relating the states of aspirator shut-off valves controlling motive flow through first and second multiple tap aspirators, respectively, with a resulting level of vacuum generation achieved by the aspirators during non-boost conditions.

DETAILED DESCRIPTION

A first multiple tap aspirator with a motive inlet coupled upstream of a compressor and a mixed flow outlet coupled downstream of a throttle may generate vacuum during non-boost conditions, and may provide compressor bypass flow during compressor bypass flow while continuing to generate some vacuum. Similarly, a second multiple tap aspirator with a motive inlet coupled downstream of a compressor and a mixed flow outlet coupled upstream of a compressor may generate vacuum during boost conditions while also providing a path for compressor bypass flow. One or more suction taps of each of the aspirators may be coupled with a fuel vapor purge system, while the remaining suction taps may be coupled with a vacuum reservoir, as in the engine system of FIG. 1. Alternatively, all suction taps of the aspirators may be coupled with a vacuum reservoir, as in the engine system of FIG. 3. Detail views of example multiple tap aspirators are provided in FIGS. 2 and 4. As shown, check valves may be arranged such that suction flow into each suction tap of an aspirator only passes through a single check valve, thereby minimizing flow losses that may occur in staged aspirators featuring multiple check valves. Different vacuum generation and suction flow levels may be achieved by a throat suction tap, diverging cone suction tap, and exit tube (straight tube) suction tap of each aspirator, as shown in the graph in FIG. 5. A level of flow through each aspirator may be controlled by controlling an aspirator shut-off valve arranged in series with the aspirator, such that one of a plurality of discrete levels of flow through the aspirators may be achieved. In accordance with the methods shown in FIGS. 8-10, a desired level of vacuum generation/fuel vapor purge may be achieved during non-boost conditions via adjustment of the aspirator shut-off valves (see FIG. 7), and a desired level of compressor bypass flow (as well as vacuum generation) may be achieved during boost conditions via adjustment of the aspirator shut-off valves (see FIG. 6). Further, in accordance with the methods shown in FIGS. 8 and 11, composition and amount of flow entering the engine for combustion after traveling through the aspirators may be measured and/or estimated, such that the engine air-fuel ratio may be compensated as needed (e.g., if motive or suction flow from the aspirators includes fuel vapors).

Figure 1:
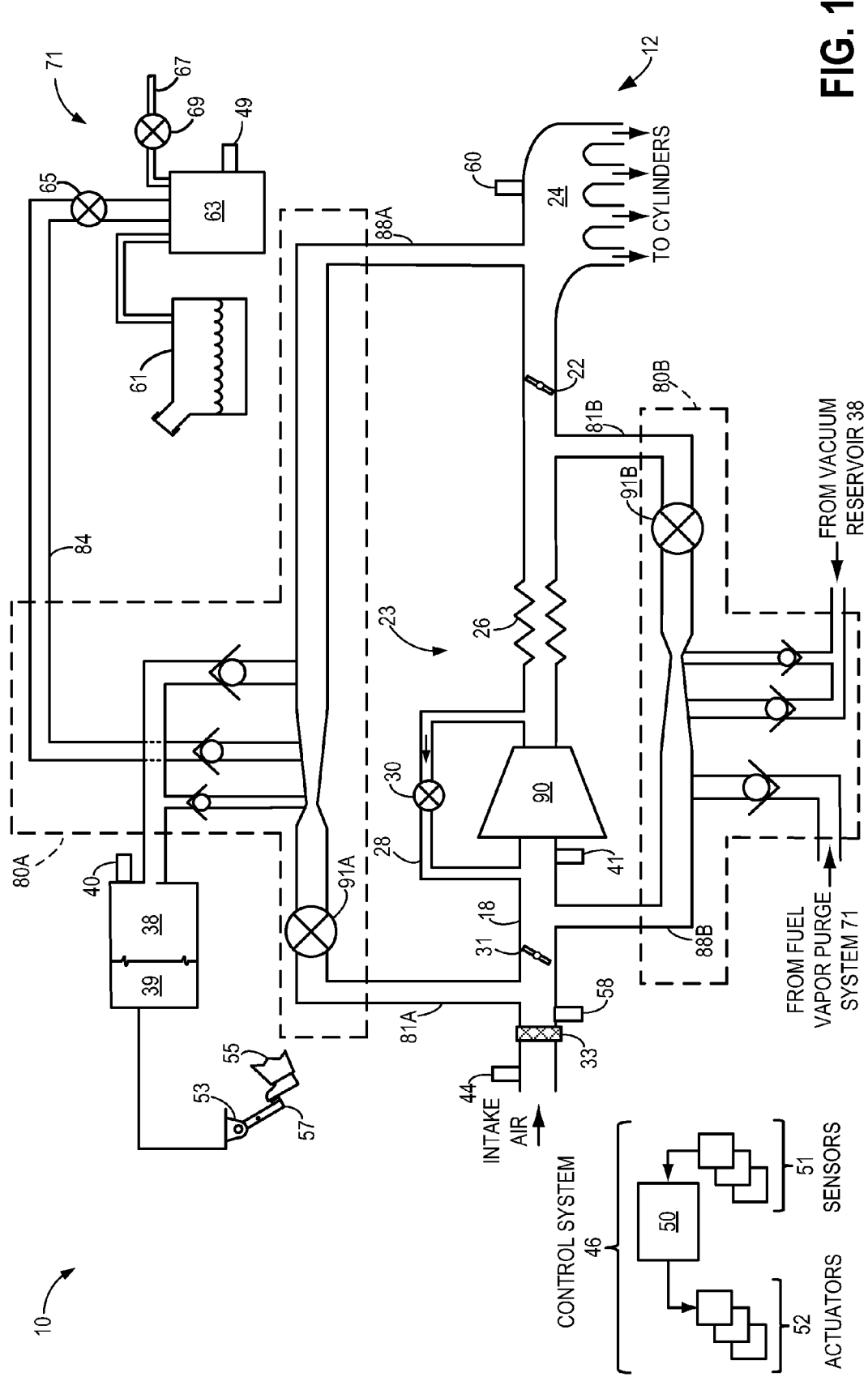
FIG. 1 shows a schematic diagram of a first embodiment of an engine system including two multiple tap aspirators, wherein a vacuum reservoir and a fuel vapor purge system are sources of suction flow for the aspirator arrangements.

Turning to FIG. 1, it shows an example engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes a control system 46. Control system 46 includes a controller 50, which may be any electronic control system of the engine system or of the vehicle in which the engine system is installed. Controller 50 may be configured to make control decisions based at least partly on input from one or more sensors 51 within the engine system, and may control actuators 52 based on the control decisions. For example, controller 50 may store computer-readable instructions in memory, and actuators 52 may be controlled via execution of the instructions.

Engine 12 has an engine intake system 23 that includes a main air intake throttle 22 fluidly coupled to an engine intake manifold 24 along an intake passage 18. Air may enter intake passage 18 from an air intake system including an air cleaner 33 in communication with the vehicle's environment. A position of throttle 22 may be varied by controller 50 via a signal provided to an electric motor or actuator included with the throttle 22, a configuration that is commonly referred to as electronic throttle control. In this manner, the throttle 22 may be operated to vary the intake air provided to the intake manifold and the plurality of engine cylinders.

A barometric pressure (BP) sensor 44 may be coupled at an inlet of intake passage 18, e.g. upstream of the air cleaner, for providing a signal regarding barometric (e.g., atmospheric) pressure to controller 50. Additionally, a mass air flow (MAF) sensor 58 may be coupled in intake passage 18 just downstream of air cleaner 33 for providing a signal regarding mass air flow in the intake passage to controller 50. In other examples, MAF sensor 58 may be coupled elsewhere in the intake system or engine system, and further, there may be one or more additional MAF sensors arranged in the intake system or engine system. Further, a sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. In some examples, additional pressure/vacuum sensors may be coupled elsewhere in the engine system to provide signals regarding pressure/vacuum in other areas of the engine system to controller 50.

Engine system 10 may be a boosted engine system, where the engine system further includes a boosting device. In the present example, intake passage 18 includes a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further compressor 90 may be, at least in part, driven by an electric motor or the engine crankshaft.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This configuration enables boost control and surge control.

In the embodiment of FIG. 1, a compressor inlet pressure (CIP) sensor 41 is arranged downstream a junction of intake passage 18 and bypass passage 28, and upstream of the compressor. CIP sensor 41 may provide a signal regarding CIP to controller 50.

An optional air induction system (AIS) throttle 31 is included in the intake passage upstream of compressor 90. A position of AIS throttle 31 may be varied by controller 50 via a signal provided to an electric motor or actuator included with the AIS throttle 31. In this manner, AIS throttle 31 may be operated to vary the pressure in the intake passage at the compressor inlet, which in turn may vary a flow rate of compressor recirculation flow in bypass passage 28. Similarly, when AIS throttle 31 is operated to vary the pressure in the intake passage at the compressor inlet, this may vary motive flow through an aspirator which has a motive outlet coupled to the intake passage upstream of the compressor, as will be described below. For example, increasing closing of AIS throttle 31 may cause reduction in pressure (e.g., increased vacuum) in a region of the intake passage intermediate the AIS throttle and the compressor inlet. Depending on the state of an ASOV regulating motive flow through the aspirator which has a motive outlet coupled upstream of the compressor, as well as the state of CBV 30, the reduction in pressure may increase motive flow through the aspirator and/or through bypass passage 28. In other examples, however, there may be no AIS throttle; instead, flow through the aspirator with its motive outlet coupled to the compressor inlet may be regulated via control of the ASOV alone, and/or flow through bypass passage 28 may be regulated via control of the CBV alone. In the embodiment of FIG. 1, engine system 10 further includes a fuel vapor purge system 71 including a fuel tank 61, which stores a volatile liquid fuel combusted in engine 12. To avoid emission of fuel vapors from the fuel tank and into the atmosphere, the fuel tank is vented to the atmosphere through adsorbent canister 63. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. In the configuration shown in FIG. 1, canister purge valve 65 controls the purging of fuel vapors from the canister into the intake manifold along a suction passage 84 coupled to a suction tap arranged at an exit tube of a multiple tap aspirator, as will be described below. Accordingly, the fuel vapor purge system may be a vacuum consumer which may request vacuum during both boost conditions and non-boost conditions as needed for purging of fuel vapor stored in the canister. When purging conditions are met, such as when the canister is saturated, vapors stored in fuel vapor canister 63 may be purged to intake manifold 24 by opening canister purge valve 65. While a single canister 63 is shown, it will be appreciated that any number of canisters may be coupled in engine system 10. In one example, canister purge valve 65 may be a solenoid valve wherein opening or closing of the valve is performed via actuation of a canister purge solenoid. Canister 63 further includes a vent 67 for routing gases out of the canister 63 to the atmosphere when storing, or trapping, fuel vapors from fuel tank 26. Vent 67 may also allow fresh air to be drawn into fuel vapor canister 63 when purging stored fuel vapors to intake manifold 24 via passage 84. While this example shows vent 67 communicating with fresh, unheated air, various modifications may also be used. Vent 67 may include a canister vent valve 69 to adjust a flow of air and vapors between canister 63 and the atmosphere. As shown, a pressure sensor 49 may be arranged in canister 63 and may provide a signal regarding the pressure in the canister to controller 50. In other examples, pressure sensor 49 may be arranged elsewhere, for example in passage 84.

Engine system 10 further includes two multiple tap aspirators 80A and 80B. Aspirators 80A and 80B may be ejectors, aspirators, eductors, venturis, jet pumps, or similar passive devices. Aspirators 80A and 80B may have an identical structure, but may be arranged at different locations within the engine system, as described below. It will be appreciated that for the sake of simplicity, an aspirator 80 is depicted in the detail view of FIG. 2. Aspirator 80 may represent the structure and components which are identical for aspirators 80A and 80B.

Figure 2:
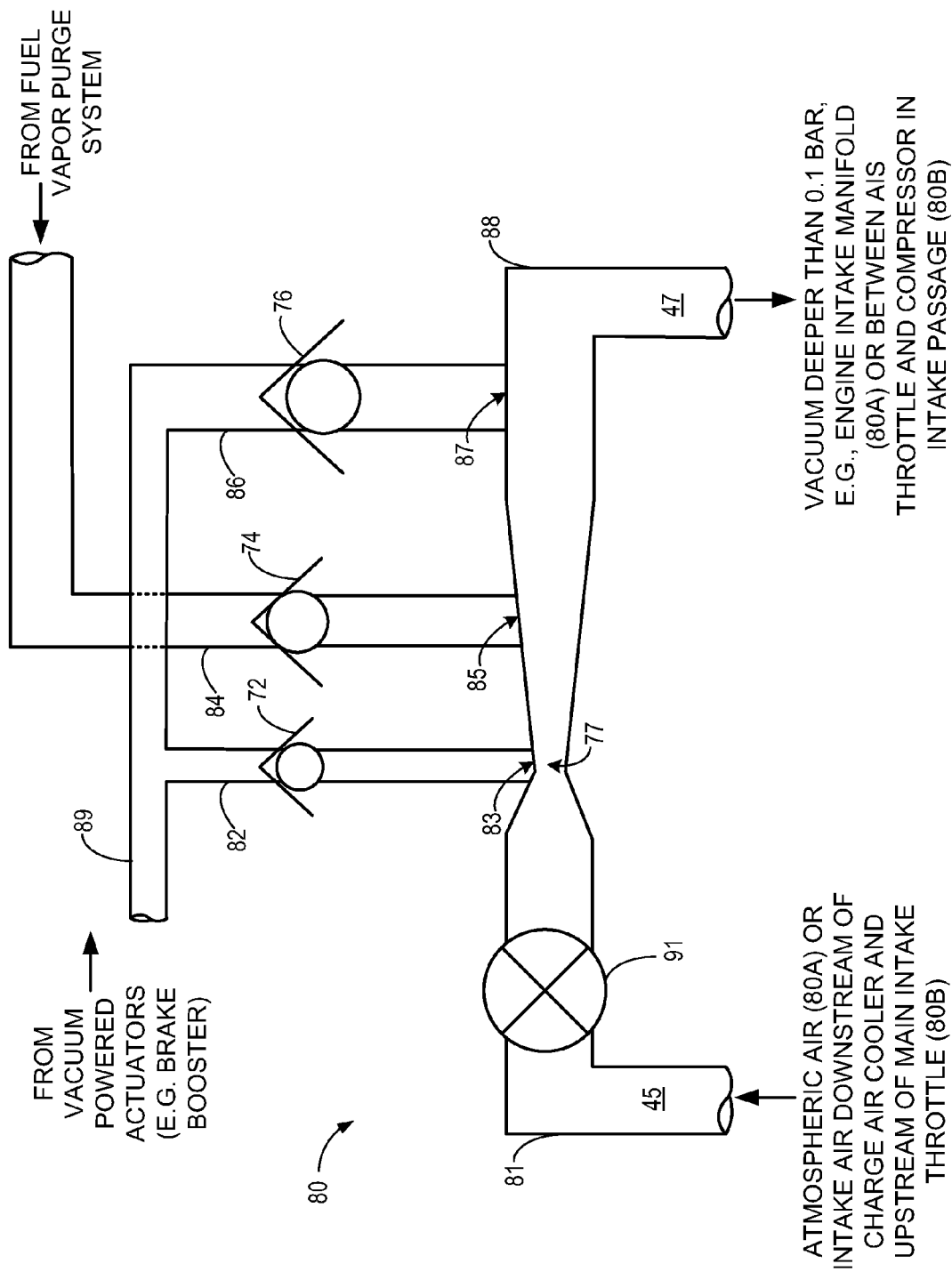
FIG. 2 shows a detail view of a multiple tap aspirator which may be included in an engine system such as the engine system of FIG. 1.

As shown in FIG. 2, aspirator 80 (e.g., both of aspirators 80A and 80B) includes at least five ports: a motive inlet 45, a mixed flow outlet 47, and at least three suction taps for vacuum generation. In the depicted embodiment, exactly three suction taps are shown: a tap at a throat 77 of the aspirator ("throat tap") 83, a tap in a diverging cone of the aspirator ("diverging cone tap") 85, and a tap in an exit tube of the aspirator ("exit tube tap") 87. As described further below, motive flow through aspirator 80 generates suction flow at one or more of the suction taps depending on vacuum levels at one or more suction flow sources and at the motive outlet of the aspirator (e.g., the intake manifold for aspirator 80A or the compressor inlet downstream of the AIS throttle for aspirator 80B), thereby generating vacuum.

In the example embodiment depicted in FIG. 2, a passage 81 (corresponding to passage 81A for aspirator 80A and 81B for aspirator 80B depicted in FIG. 1) couples motive inlet 45 of aspirator 80 with either the intake passage 18 near an inlet of the intake passage downstream of air filter 33 (e.g., for aspirator 80A), or with intake passage 18 downstream of charge air cooler 26 and upstream of throttle 22 (e.g., for aspirator 80B). In other examples, passage 81 may couple the motive inlet of aspirator 80 with the intake passage at another portion, or alternatively, passage 81 may lead directly to atmosphere or to another part of the engine system instead of being coupled to the intake passage. Further, in the depicted embodiment, a passage 88 (corresponding to passage 88A for aspirator 80A and 88B for aspirator 80B depicted in FIG. 1) couples mixed flow outlet 47 of aspirator 80 with either intake manifold 24 (e.g., for aspirator 80A) or with intake passage 18 downstream of AIS throttle 31 and upstream of compressor 90 (e.g., for aspirator 80B). However, in other embodiments, passage 88 may couple the mixed flow outlet of aspirator 80 with another portion of the engine system, e.g. a portion which has a vacuum level deeper than 0.1 bar.

Each suction tap of the aspirator has a corresponding passage. As shown in FIG. 2, a suction passage 82 couples tap 83 of aspirator 80 with common passage 89, a suction passage 84 couples tap 85 with fuel vapor purge system 71, and a suction passage 86 couples tap 87 with common passage 89, such that suction passages 82 and 86 effectively merge to form common passage 89. In the depicted example, the suction passages have different dimensions; that is, suction passage 82 is smaller than suction passage 84, and suction passage 84 is smaller than suction passage 86. As detailed below, such an arrangement may be appropriate as the amount of suction flow occurring through suction passage 82 may be smaller than the amount of suction flow occurring through suction passage 84, which may in turn be smaller than the amount of suction flow occurring through passage 86.

In the embodiment of FIGS. 1-2, suction passages 82 and 86 merge into a common passage 89. As shown, no check valves are arranged in common passage 89. Instead, a check valve is arranged in each of suction passages 82 and 86 upstream of a juncture of these passages with common passage 89. Specifically, a check valve 72 is arranged in suction passage 82, and a check valve 76 is arranged in suction passage 86. Further, a check valve 74 is arranged in suction passage 84. While the depicted embodiment shows the check valves as distinct valves, in alternate embodiments, each check valve may be integrated into the aspirator, for example proximal to the corresponding suction tap.

Whereas known multiple tap aspirators may require suction flow to pass through multiple check valves (e.g., multiple check valves arranged in series or arranged in a common passage between the junctures of suction passages with the common passage), the depicted arrangement advantageously requires suction flow to pass through only a single check valve as it travels from a source of suction flow to the aspirator via one of the suction passages, thereby reducing flow losses which may result from flow through multiple check valves. The check valve arranged in each suction passage prevents backflow from aspirator 80 to the source of suction flow, thereby allowing vacuum reservoir 38 to retain its vacuum should the pressures at the motive inlet of aspirator 80 and the vacuum reservoir equalize. For example, in the context of aspirator 80A, check valves 72, 74, and 76 prevent reverse flow from the intake manifold, e.g. which might otherwise occur during conditions when intake manifold pressure is higher than pressure at the suction flow source(s). Similarly, check valves 72, 74, and 76 help to prevent fluid such as an intake air charge from flowing from passage 81 into the suction flow source(s). In the context of aspirator 80B, check valves 72, 74, and 76 prevent reverse flow from the intake passage intermediate the AIS throttle and the compressor inlet, e.g. which might otherwise occur during conditions when compressor inlet pressure is higher than pressure at the suction flow source(s). Similarly, check valves 72, 74, and 76 help to prevent fluid from flowing from the intake passage intermediate charge air cooler 26 and throttle 22 into passage 81 and then into the suction flow source(s). Therefore, advantageously, this arrangement is designed such that the pressure differential driving motive flow rate through the aspirator may be variable and intermittent (in contrast to an industrial application where the motive flow rate is consistently available).

In the embodiment of FIGS. 1-2, suction taps 83 and 87 of aspirator 80A communicate with a vacuum reservoir 38 by way of common passage 89A, while suction taps 83 and 87 of aspirator 80B communicate with vacuum reservoir 38 by way of a common passage 89B. In some examples, passages 89A and 89B may be the same passage, and thus suction taps 83 and 87 of aspirator 80A and suction taps 83 and 87 of aspirator 80B may all communicate with the vacuum reservoir via a common passage. Alternatively, passages 89A and 89B may be separate passages coupled to vacuum reservoir 38 at isolated locations. Vacuum reservoir 38 may provide vacuum to one or more vacuum actuators 39 of the engine system. In one non-limiting example, vacuum actuators 39 may include a brake booster coupled to vehicle wheel brakes wherein vacuum reservoir 38 is a vacuum cavity in front of a diaphragm of the brake booster, as shown in FIG. 1. In such an example, vacuum reservoir 38 may be an internal vacuum reservoir configured to amplify a force provided by a vehicle operator 55 via a brake pedal 57 for applying vehicle wheel brakes (not shown). A position of the brake pedal 57 may be monitored by a brake pedal sensor 53. In alternate embodiments, the vacuum reservoir may be a low pressure storage tank included in a fuel vapor purge system such as fuel vapor purge system 71, a vacuum reservoir coupled to a turbine wastegate, a vacuum reservoir coupled to a charge motion control valve, etc. In such embodiments, vacuum consumption devices 39 of the vehicle system may include various vacuum-actuated valves such as charge motion control valves, a 4×4 hub lock, switchable engine mounts, heating, ventilation and cooling, vacuum leak checks, crankcase ventilation, exhaust gas recirculation, gaseous fuel systems, compressor bypass valves (e.g., CBV 30 shown in FIG. 1), wheel-to-axle disconnect, etc. In one example embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. In some embodiments, as depicted, a sensor 40 may be coupled to the vacuum reservoir 38 for providing an estimate of the vacuum level at the reservoir. Sensor 40 may be a gauge sensor reading vacuum, and may transmit data as negative vacuum (e.g., pressure) to controller 50. Accordingly, sensor 40 may measure the amount of vacuum stored in vacuum reservoir 38.

Due to the converging-diverging shape of aspirator 80 in the depicted example, the flow of atmospheric air from motive inlet 45 to mixed flow outlet 47 of aspirator 80 may generate a low pressure at one or more of the suction taps of the aspirator, depending on relative vacuum levels in the vacuum reservoir and fuel vapor purge system and at the mixed flow outlet of aspirator 80 (e.g., in the intake manifold). This low pressure may induce a suction flow from common passage 89 into one or more of suction taps 83 and 87, and/or from fuel vapor purge system 71 into suction tap 85, thereby generating vacuum at vacuum reservoir 38 and/or purging fuel vapors from fuel vapor purge system 71.

Because suction tap 83 is arranged at throat 77 of aspirator 80, which is the portion of the aspirator with the smallest cross-sectional flow area, the venturi effect is strongest at suction tap 83 and thus more vacuum may be generated at suction tap 83 as compared to the other suction taps. Suction tap 87, which is arranged in the exit tube of aspirator 80 (which may be a straight tube as shown), is arranged at a portion of the aspirator with a larger cross-sectional flow area relative to suction taps 83 and 85, and full pressure recovery of the motive fluid flowing through the aspirator occurs before the fluid passes suction tap 87. A larger suction flow may be achievable via suction tap 87 relative to the suction flow achievable via suction taps 83 and 85. While suction flow entering suction tap 87 may not contribute to vacuum generation, it advantageously provides a direct path for a high volume of flow from the vacuum reservoir to the mixed flow outlet of the aspirator. Further, the inventors herein have identified that inclusion of suction tap 87 in the exit tube of aspirator 80 may provide improved suction flow at the other suction taps of the aspirator, as compared to embodiments where a bypass passage directly connecting a suction flow source with the mixed flow outlet is provided in a separate passage, or in the diverging cone of the aspirator.

Depending on a pressure differential between the fuel vapor purge system and the mixed flow outlet of the aspirator (e.g., the intake manifold for aspirator 80A and the intake passage between the AIS throttle and the compressor inlet for aspirator 80B), suction flow may occur from the fuel vapor purge system to the mixed flow outlet of the aspirator via suction passage 84 and suction tap 85. This suction flow may serve to purge fuel vapors from fuel vapor purge system 71, for example when canister purge valve 65 is at least partially open.

It will be appreciated that the inclusion of multiple taps in aspirator 80 enables the aspirator to achieve the different advantages associated with placing a suction tap at different parts of the aspirator. For example, deep vacuum but small flow may be achieved via the throat tap, shallow vacuum but high flow may be achieved via the diverging cone tap, and no vacuum enhancement but very high flow may be achieved via the exit tube tap. Further, in contrast to known multiple tap aspirators such as Gast generators which must be coupled between a high pressure source and a low pressure sink (e.g., between a compressed air source at 5 bar and atmosphere at 0 bar), aspirator 80 may be coupled between a source with a pressure at or near atmospheric pressure and a lower pressure source (e.g., it may receive atmospheric air at its motive inlet and deliver mixed flow to a sink with vacuum deeper than 0.1 bar such as the intake manifold).

In some examples, aspirator 80 may operate passively, e.g., whether motive flow passes through aspirator 80 may depend upon pressures within engine system 10 and other engine operating parameters without any active control performed by the control system. However, in the embodiment of FIGS. 1-2, an aspirator shut-off valve (ASOV) 91 is actively controlled to allow/disallow motive flow through each aspirator (in the case of a binary ASOV) or to reduce/increase flow through the aspirator (in the case of a continuously variable ASOV). As shown, ASOV 91 is arranged in passage 81 upstream of throat 77 of aspirator 80; in other embodiments, the ASOV may be arranged downstream of the throat of the aspirator (e.g., in the exit tube or downstream of the exit tube), or the ASOVs may be integral to the aspirator (e.g., the valve may be arranged at the throat of the aspirators). One advantage of positioning the ASOV upstream of the aspirator is that when the ASOV is upstream, the pressure loss associated with the ASOV has less of an impact as compared to configurations where the ASOV is downstream of the aspirator or where the ASOV is integral to the aspirator.

ASOV 91 may be a solenoid valve which is actuated electrically, and its state may be controlled by controller 50 based on various engine operating conditions. However, as an alternative, the ASOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

Whether it is actuated electrically or with vacuum, ASOV 91 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ASOV may provide greater flexibility in control of the motive flow through the aspirator, with the drawback that continuously variable valves may be much more costly than binary valves.

In other examples, ASOV 91 may be a gate valve, pivoting plate valve, poppet valve, or another suitable type of valve.

For descriptive purposes, in the methods described herein, the two ASOVs may be referred to as ASOV A and ASOV B, where ASOV A refers to ASOV 91A which controls motive flow through aspirator 80A and ASOV B refers to ASOV 91B which controls motive flow through aspirator 80B. Similarly, aspirator 80A may be one example of an aspirator A referred to herein, and aspirator 80B may be one example of an aspirator B referred to herein.

Reverse flow through the aspirators may be desirable during certain conditions. As used herein, reverse flow denotes motive flow from the mixed flow outlet of an aspirator to the motive inlet of the aspirator. For example, if ASOV A is open, and the compressor is operating while boost conditions are present, reverse flow through aspirator A may occur due to the higher pressure at the mixed flow outlet of the aspirator relative to the pressure at the motive inlet of the aspirator. As another example, if ASOV B is open, and boost conditions are not present (e.g., the compressor is not operating), reverse flow through aspirator B may occur due to the higher pressure at the mixed flow outlet of the aspirator relative to the pressure at the motive inlet of the aspirator. If aspirator 80 is an asymmetrical aspirator such as the aspirators depicted in FIGS. 1-4, reverse flow may generate less vacuum than is generated through forward flow through the aspirator. Alternatively, aspirator 80 may be designed with a flow geometry that maximizes vacuum generation for bidirectional flow.

As will be detailed herein, control of the states of ASOVs A and B may enable four discrete levels of vacuum generation and four discrete levels of continuous compressor bypass, depending on whether boost is active. For example, when boost conditions are present, the dual ASOVs may provide functionality similar to that provided by continuous compressor bypass valves in engine systems incorporating such valves. That is, depending on whether neither ASOV is open, only ASOV A is open, only ASOV B is open, or both ASOVs are open, one of four discrete levels of compressor recirculation flow may be achieved. In contrast, when boost conditions are not present, the dual ASOVs may provide controllable levels of vacuum generation. Depending on whether neither ASOV is open, only ASOV A is open, only ASOV B is open, or both ASOVs are open, one of four discrete levels of vacuum generation may be achieved.

In engine systems where it is desired that the operation of the dual ASOVs provides the same flexibility in terms of flow levels as an actual continuous compressor bypass valve, the ASOVs may be continuously variable valves rather than binary (open/closed) valves. As another alternative, one of the two ASOVs may be a continuously variable valve, while the other ASOV may be a binary valve, which may provide increased flexibility with respect to flow levels while reducing costs. Similarly, whether the ASOVs are binary valves or continuously variable valves may depend upon how much flexibility is required for vacuum generation (e.g., one or both ASOVs may be continuously variable valves if more than four discrete levels of vacuum generation are desired).

Further approximation of a continuous compressor bypass valve during boost conditions may be achieved via control of compressor recirculation flow via a dedicated compressor recirculation passage such as passage 28 (e.g., via control of CBV 30). For example, if binary ASOVs are used, more than four discrete levels of total compressor bypass flow may be achieved via selective opening and closing of the CBV (or via adjustment of the CBV if the CBV is a continuously variable valve). Such implementations may achieve improved flexibility while reducing costs, e.g. as it may be cheaper to implement CBV controls relative to substituting continuously variable ASOVs for binary ASOVs, and/or as it may be cheaper to use a continuously variable CBV than continuously variable ASOV(s) depending on dimensions of the various flow passages within the system.

Figure 3:
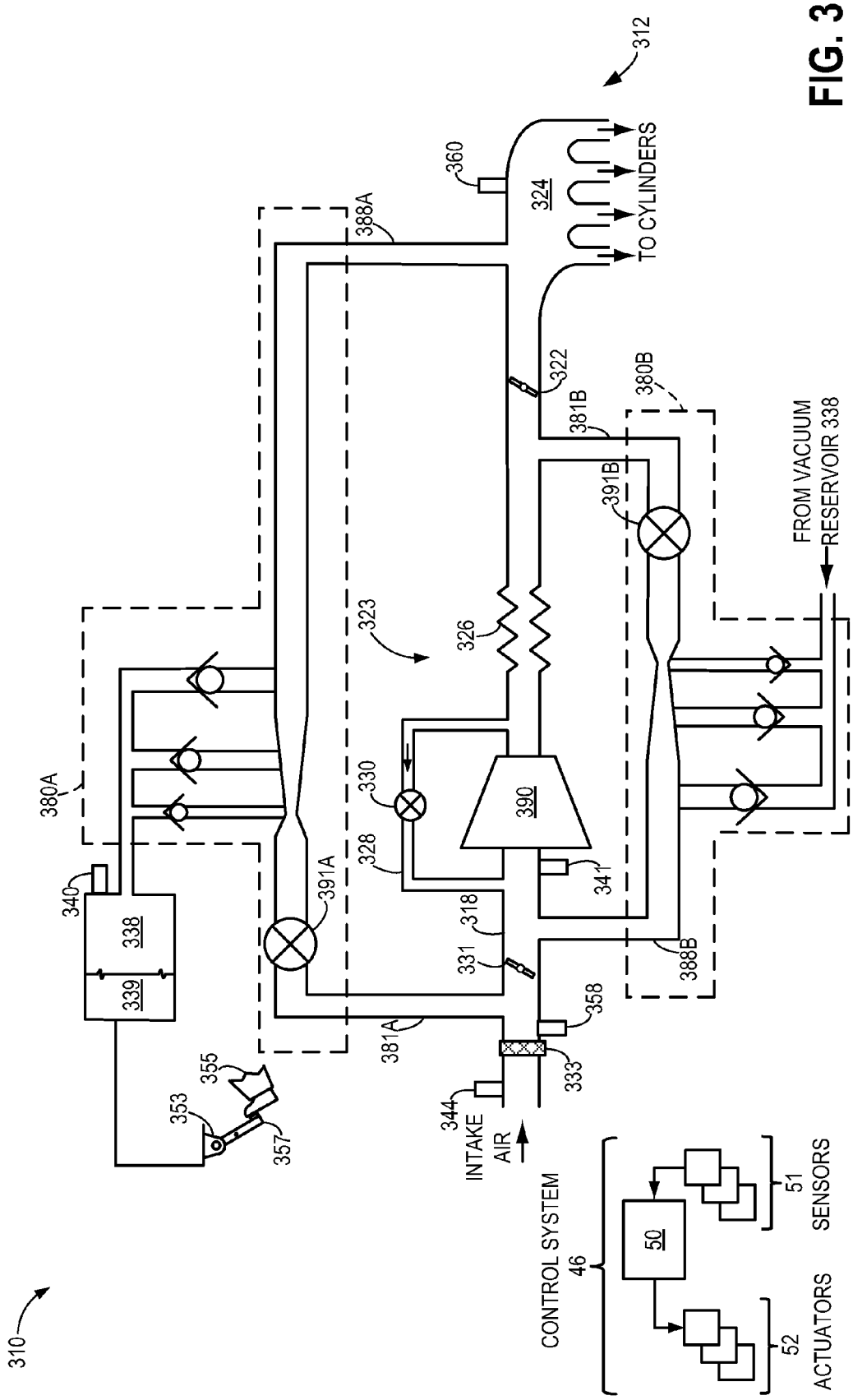
FIG. 3 shows a schematic diagram of a second embodiment of an engine system including two multiple tap aspirators, wherein a vacuum reservoir is the sole source of suction flow for the aspirators.
Figure 4:
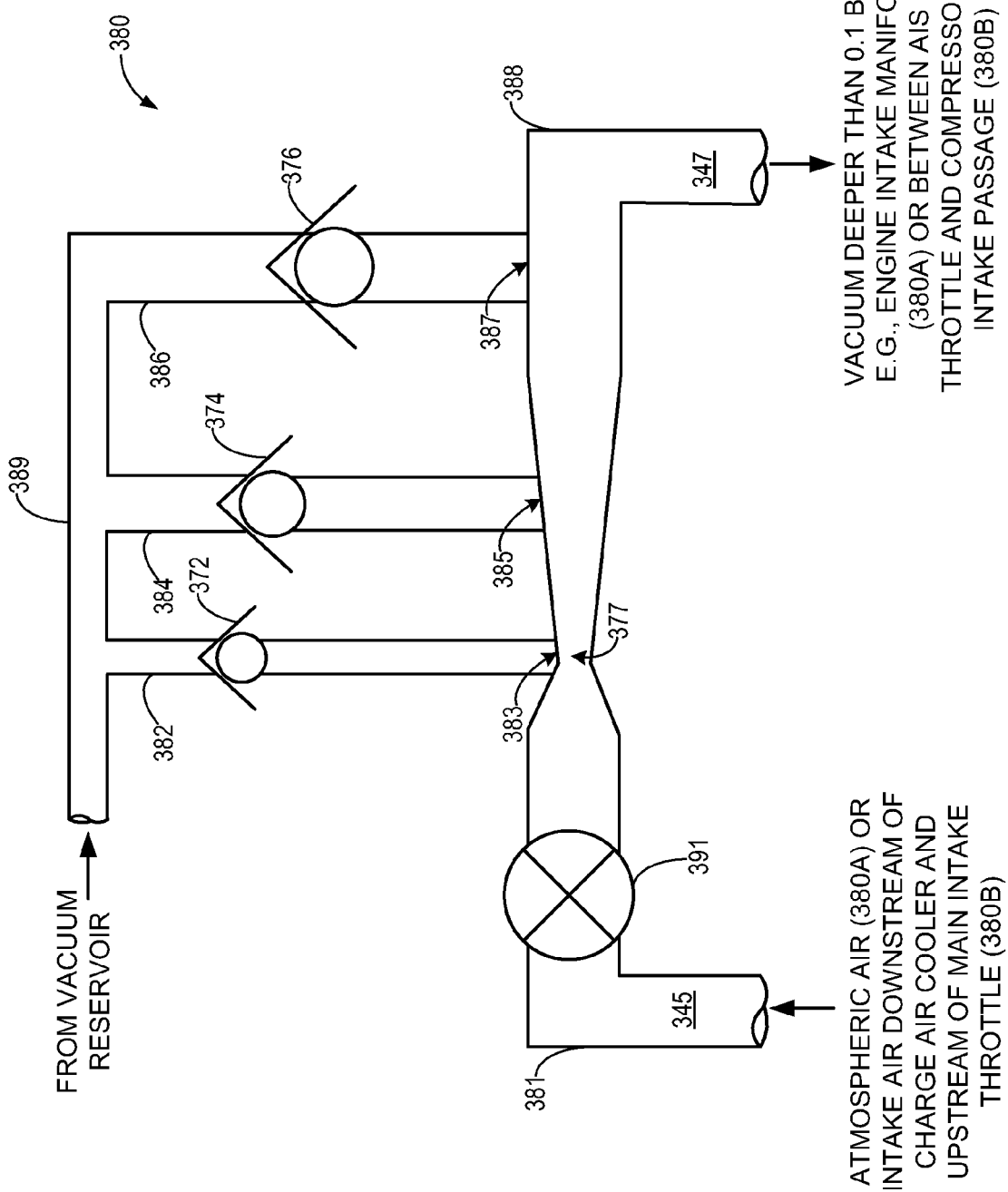
FIG. 4 shows a detail view of a multiple tap aspirator which may be included in an engine system such as the engine system of FIG. 3.

A second embodiment of an engine system including two multiple tap aspirators is depicted in FIG. 3, and a detail view of a multiple tap aspirator which may be included in the engine system of FIG. 3 is shown in FIG. 4. The second embodiment includes many of the same features described above for the first embodiment; similar features are numbered similarly and will not be described again for the sake of brevity. Further, it will be appreciated that various features among the two embodiments are usable together. For example, the multiple tap aspirator and suction passages of FIG. 3 may be configured in accordance with FIG. 2 rather than FIG. 4, or the multiple tap aspirator and suction passages of FIG. 1 may be configured in accordance with FIG. 4 rather than FIG. 2, without departing from the scope of this disclosure.

In contrast to the first embodiment wherein a fuel vapor purge system and a vacuum reservoir serve as suction flow sources for the aspirators, all suction flow is provided by a common source—the vacuum reservoir—in the second embodiment. That is, all three suction passages of aspirator 380 merge into a common passage 389 which is coupled with vacuum reservoir 338 for use by vacuum actuators 339. Because exit tube tap 387 is coupled with vacuum reservoir 338 via check valve 376, check valve 376 may allow air to flow to the mixed flow outlet of the aspirator (e.g., the intake manifold or the intake passage intermediate the AIS throttle and compressor inlet) from vacuum reservoir 338, and may limit air flow to vacuum reservoir 38 from the mixed flow outlet of the aspirator. Accordingly, during conditions where the pressure at the mixed flow outlet of the aspirator is negative (e.g., when vacuum is deeper than 0.1 bar), the mixed flow outlet (e.g., the intake manifold or the intake passage intermediate the AIS throttle and the compressor inlet) may be a vacuum source for vacuum reservoir 338. In examples where vacuum consumption device 339 is a brake booster, inclusion of suction passage 386 in the system may advantageously provide a bypass path which may ensure that the brake booster is evacuated nearly instantaneously whenever the pressure at the mixed flow outlet of the aspirator is lower than brake booster pressure. It will be appreciated that another engine component or subsystem, other than the vacuum reservoir, may serve as the suction flow source for all suction taps for the aspirators, without departing from the scope of this disclosure.

As noted above with respect to the first embodiment, in the methods described herein, the two ASOVs of the second embodiment may be referred to as ASOV A and ASOV B, where ASOV A refers to ASOV 391A which controls motive flow through aspirator 380A and ASOV B refers to ASOV 391B which controls motive flow through aspirator 380B. Similarly, aspirator 380A may be one example of the aspirator A referred to herein, and aspirator 380B may be one example of the aspirator B referred to herein.

Figure 5:
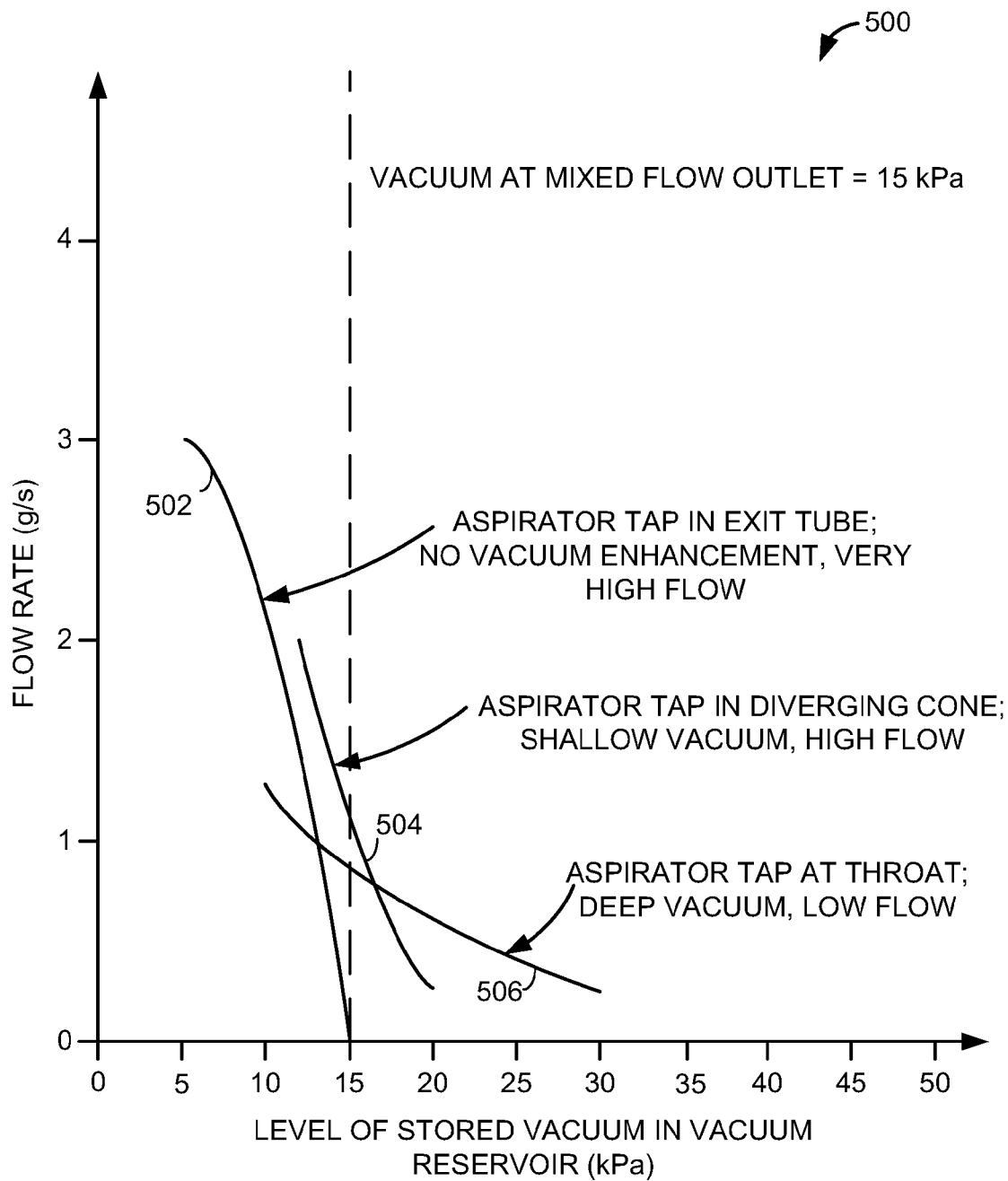
FIG. 5 shows a graph of exemplary relationships between flow rate at each suction tap of a multiple tap aspirator and vacuum reservoir vacuum level, for a vacuum level of 15 kPa at the mixed flow outlet of the aspirator.

Graph 500 of FIG. 5 depicts the flow rates through the suction passages coupled to the exit tube tap, diverging cone tap, and throat tap of a multiple tap aspirator such as the multiple tap aspirator shown in FIG. 4 (e.g., wherein all of the aspirator's suction taps are coupled with a same vacuum reservoir). The x-axis of graph 500 represents flow rate (g/s), and the y-axis represents vacuum reservoir vacuum (kPa).

While graph 500 depicts exemplary flow rates through aspirator suction passages for a vacuum level of 15 kPa at the mixed flow outlet of the aspirator (as represented by the dashed vertical line at 15 kPa), it will be appreciated that similar graphs may be created for different vacuum levels at the mixed flow outlet of the aspirator. Further, the numeric values of flow rate and stored vacuum level shown in FIG.

5 are provided for exemplary purposes only; actual values may vary based on the dimensions and geometry of various engine system components such as the aspirator and associated passages.

As shown in graph 500, the flow rate in a given suction passage may vary with the level of stored vacuum in the vacuum reservoir. Characteristic 502 represents the flow rate through the exit tube suction passage of the aspirator (e.g., the flow rate of fluid traveling from the vacuum reservoir into the exit tube tap of the aspirator). In the depicted example, when the level of stored vacuum in the vacuum reservoir is less than the vacuum level at the mixed flow outlet of the aspirator, fluid flows from the vacuum reservoir into the exit tube tap, at a rate which decreases as the level of stored vacuum in the vacuum reservoir approaches the vacuum level at the mixed flow outlet of the aspirator (in this example, 15 kPa). As discussed herein, while fluid flow into the exit tube tap of the aspirator does not harness the venturi effect so as to generate vacuum, as the exit tube may be a straight tube, such flow may advantageously provide a fast pull-down of the vacuum reservoir (e.g., fast pull-down of the brake booster in examples where the vacuum reservoir is a vacuum reservoir of a brake booster) during conditions where the aspirator's mixed flow outlet vacuum level (e.g., intake manifold vacuum level for aspirator 380A of FIG. 3 and vacuum level between the AIS throttle and compressor outlet for aspirator 380B of FIG. 3) is greater than the vacuum reservoir vacuum. That is, whereas vacuum may be generated via fluid flow into the throat tap and diverging cone tap of the aspirator, at a lower rate, fluid may flow into the exit tube tap at a higher rate without generating vacuum, which may be desirable during certain engine operating conditions such as when vacuum reservoir pull-down is needed.

Characteristic 504 represents the flow rate through the diverging cone tap suction passage of the aspirator (e.g., the flow rate of fluid traveling from the vacuum reservoir into the diverging cone tap of the aspirator). In the depicted example, when the level of stored vacuum in the vacuum reservoir ranges from approximately 12 kPa to approximately 20 kPa, fluid flows from the vacuum reservoir into the diverging cone tap, at a rate which decreases as the level of stored vacuum in the vacuum reservoir increases. As shown, the absolute value of the slope of characteristic 504 may be less than the absolute value of the slope of characteristic 502, for example as a result of the increase in vacuum stored in the vacuum reservoir that occurs due to generation of vacuum via the flow of fluid from the vacuum reservoir into the diverging cone tap of the aspirator.

Characteristic 506 represents the flow rate through the throat tap suction passage of the aspirator (e.g., the flow rate of fluid traveling from the vacuum reservoir into the throat tap of the aspirator). In the depicted example, when the level of stored vacuum in the vacuum reservoir ranges from approximately 10 kPa to approximately 30 kPa, fluid flows from the vacuum reservoir into the throat tap, at a rate which decreases as the level of stored vacuum in the vacuum reservoir increases. As shown, the absolute value of the slope of characteristic 506 may be less than the absolute value of characteristic 504, for example as a result of the generation of vacuum in the vacuum reservoir that occurs due to the flow of fluid from the vacuum reservoir into both the diverging cone tap of the aspirator and the throat tap of the aspirator.

As discussed herein, while fluid flow into the exit tube tap of the aspirator may not harness the venturi effect, as the exit tube may be a straight tube, such flow may provide fast pull-down of the vacuum reservoir (e.g., fast pull-down of the brake booster in examples where the vacuum reservoir is a vacuum reservoir of a brake booster) during conditions where the vacuum level at the mixed flow outlet of the aspirator is greater than the vacuum reservoir vacuum. That is, whereas more vacuum may be generated via fluid flow into the throat tap and diverging cone tap of the aspirator, at a lower rate, relatively less vacuum may be generated via fluid flow into the exit tube tap at a higher rate, which may be desirable during certain engine operating conditions.

By summing characteristics 502, 504, and 506 at a given level of stored vacuum in the vacuum reservoir, the total suction flow rate into the aspirator may be determined. This determination may be made at controller 50 of control system 46, e.g. based on pressure/vacuum levels sensed by sensors 51. Once determined, the total suction flow rate may be used as a basis for control of various actuators 52 of the engine system. For example, based on the total suction flow rate of an aspirator which has a mixed flow outlet coupled to the intake manifold (e.g., aspirator 380A of FIG. 3), the main intake throttle may be adjusted based on the total suction flow rate such that a desired engine air-fuel ratio is maintained (e.g., an opening amount of the throttle may be decreased as the total suction flow rate increases).

In view of the suction flow characteristics for the different suction taps of the multiple tap aspirator shown in FIG. 5, it will be appreciated that the multiple tap aspirator described herein may advantageously provide both high vacuum generation (e.g., via the throat tap and diverging cone tap) and high suction flow (e.g., via the exit tube tap). This is in contrast to traditional aspirators which may provide either high vacuum generation or high suction flow but not both. Further, the multiple tap aspirator described herein may advantageously provide optimal suction flow at all vacuum reservoir levels due to the strategic placement of the different suction taps. Furthermore, due to the placement of the check valves in the aspirator suction tubes, suction flow need only pass through one check valve, as opposed to multiple check valves, which may minimize flow losses. Moreover, due to the inclusion of a check valve in each suction passage, vacuum in the vacuum reservoir may be retained even when motive flow through the aspirator ceases.

FIG. 6 depicts a table 600 relating the states of ASOVs A and B (e.g., ASOVs 91A and 91B of the first embodiment or ASOVs 391A and 391B of the second embodiment) with a corresponding level of compressor bypass flow and vacuum generation through aspirators A and B during boost operation. Table 600 is directed to an embodiment such as the engine system depicted in FIG. 1 or FIG. 3 wherein the aspirators are asymmetrical and thus vacuum generation is greater for forward motive flow through each aspirator than for reverse motive flow through the aspirator. Further, table 600 is directed to an embodiment such as the engine system depicted in FIG. 1 or FIG. 3 wherein the motive inlets and mixed flow outlets of the aspirators are positioned such that the motive flow levels through the two aspirators are different during a given boost operating condition due to pressure differentials within the engine system. For example, during boost operation, the level of compressor bypass flow through aspirator A may be less than the level of compressor bypass flow through aspirator B, because the pressure differential between the intake manifold and the intake passage upstream of the AIS throttle may be less than the pressure differential between the intake passage upstream of the intake throttle and the intake passage intermediate the AIS throttle and compressor inlet (e.g., depending on positions of the AIS throttle and main throttle). In contrast, during non-boost conditions, the level of compressor bypass flow through aspirator B may be less than the level of compressor bypass flow through aspirator A, because the pressure differential between the intake manifold and the intake passage upstream of the AIS throttle may be greater than the pressure differential between the intake passage upstream of the intake throttle and the intake passage intermediate the AIS throttle and compressor inlet when the compressor is not operating (e.g., also depending on positions of the AIS throttle and main throttle).

As shown in the first row of table 600, a zeroth level of compressor bypass flow and a zeroth level of vacuum generation may be achieved by controlling both of ASOVs A and B to be in a closed state. In the depicted example, when both ASOVs are closed, no motive flow (and thus no compressor bypass flow) passes through the aspirators, although compressor bypass flow via a dedicated compressor recirculation passage such as passage 28 may still occur depending on a state of CBV 30. Because there is no motive flow through the aspirators when both ASOVs are closed, the ASOVs do not generate any vacuum, and thus the level of vacuum generated during this condition is a zeroth level wherein no vacuum is generated.

The second row of table 600 corresponds to a first level of compressor bypass flow and a first level of vacuum generation. The first level of compressor bypass flow and first level of vacuum generation may be achieved by controlling ASOV A to be in an open state and controlling ASOV B to be in a closed state. The first level of compressor bypass flow is greater than the zeroth level of compressor bypass flow in the depicted example, and the first level of vacuum generation is greater than the zeroth level of vacuum generation in the depicted example. With ASOV A open and ASOV B closed, motive flow (and thus compressor bypass flow) occurs through aspirator A but not through aspirator B. During this condition, while it is not included in table 600, additional compressor bypass flow via a dedicated compressor recirculation passage such as passage 28 may also occur depending on a state of CBV 30. It will be appreciated that the first levels of compressor bypass flow and vacuum generation may depend upon various engine operating parameters, such main throttle position which affects the pressure differential across aspirator A (as aspirator A is coupled to the intake passage upstream of the AIS throttle and downstream of the main throttle in the depicted examples). For example, when the main throttle is adjusted such that engine intake airflow is restricted to a first, larger amount, MAP may be higher as compared to MAP when the main throttle is adjusted such that engine intake airflow is restricted to a second, smaller amount. Because the pressure at the motive inlet of aspirator A is approximately BP, a larger pressure differential may occur during boost operation for a higher value of MAP versus for a lower value of MAP. Thus, as the motive flow level through an aspirator may be a function of the pressure differential across the aspirator, among other factors, main throttle adjustment may factor into determination of the first compressor bypass level and, in turn, the first vacuum generation level (as vacuum generation level of an aspirator may be a function of motive flow through the aspirator, among other factors).

The third row of table 600 corresponds to a second level of compressor bypass flow and a second level of vacuum generation. The second level of compressor bypass flow and second level of vacuum generation may be achieved by controlling ASOV B to be in an open state and controlling ASOV A to be in a closed state. With ASOV B open and ASOV A closed, motive flow (and thus compressor bypass flow) occurs through aspirator B but not through aspirator A. During this condition, while it is not included in table 600, additional compressor bypass flow via a dedicated compressor recirculation passage such as passage 28 may also occur depending on a state of CBV 30. The second level of compressor bypass flow may be greater than the first level of compressor bypass flow discussed above, and thus the second level of vacuum generation may be greater than the first level of vacuum generation discussed above. For example, as noted above, during boost operation the level of compressor bypass flow through aspirator A may be less than the level of compressor bypass flow through aspirator B, because the pressure differential between the intake manifold and the intake passage upstream of the AIS throttle may be less than the pressure differential between the intake passage upstream of the intake throttle and the intake passage intermediate the AIS throttle and compressor inlet (e.g., depending on positions of the AIS throttle and main throttle). That is, for engine systems such as those depicted in FIGS. 1 and 3, the pressure at the compressor inlet side of aspirator B is necessarily less than or equal to the pressure at the compressor inlet side of aspirator A (due to the presence of the AIS throttle), whereas the pressure at the compressor outlet side of aspirator B is necessarily greater than or equal to the pressure at the compressor outlet side of aspirator A. As such, the pressure differential across aspirator B may necessarily be greater than the pressure differential across aspirator A, resulting in higher motive flow through aspirator B than through aspirator A during boost conditions. Further, in embodiments such as those depicted in FIGS. 1 and 3 where the aspirators are asymmetrical such that vacuum generation is maximized for forward flow and a lower level of vacuum generation (if any) occurs during reverse flow, it will be appreciated that more vacuum is generated when ASOV B alone is open versus when ASOV A alone is open. This may result from both the higher motive flow rate through aspirator B and the fact that during boost there is forward flow through aspirator B when ASOV B is open whereas during boost there is reverse flow through aspirator A when ASOV A is open. These system dynamics may not apply to embodiments with symmetrical aspirators which generate comparable amounts of vacuum for both forward and reverse flow, however.

It will be appreciated that the second levels of compressor bypass flow and vacuum generation may depend upon various engine operating parameters, such AIS throttle position which affects the pressure differential across aspirator B (as aspirator B is coupled to the intake passage downstream of the AIS throttle and upstream of the main throttle in the depicted examples). For example, when the AIS throttle is adjusted such that air flow entering the compressor is restricted to a first, larger amount, CIP may be higher as compared to CIP when the AIS throttle is adjusted such that air flow entering the compressor is restricted to a second, smaller amount. Because the pressure at the mixed flow outlet of aspirator B is approximately CIP, a larger pressure differential may occur during boost operation for a higher value of CIP versus for a lower value of CIP. Thus, as the motive flow level through an aspirator may be a function of the pressure differential across the aspirator, among other factors, AIS throttle adjustment may factor into determination of the second compressor bypass level and, in turn, the second vacuum generation level.

The fourth row of table 600 corresponds to a third level of compressor bypass flow and a third level of vacuum generation. The third level of compressor bypass flow and third level of vacuum generation may be achieved by controlling both ASOV A and ASOV B to be in an open state. With both ASOVs open, motive flow (and thus compressor bypass flow) occurs through both aspirators. During this condition, while it is not included in table 600, additional compressor bypass flow via a dedicated compressor recirculation passage such as passage 28 may also be obtained as needed via control of CBV 30. The third level of compressor bypass flow may be greater than the second level of compressor bypass flow discussed above, and thus the third level of vacuum generation may be greater than the second level of vacuum generation discussed above. For example, depending on the pressure level downstream of the compressor, the third level of compressor bypass flow may be equal to the sum of the first and second levels of compressor bypass flow, and the third level of vacuum generation may be equal to the sum of the first and second levels of vacuum generation (e.g., during compressor surge and assuming all other relevant engine operating conditions are constant). This may not be the case when compressor surge is not occurring; during such conditions, there may be a different relationship between the first, second, and third compressor bypass and vacuum generation levels. The third levels of compressor bypass flow and vacuum generation may represent maximum compressor bypass flow and vacuum generation levels achievable via the aspirators during boost for a given set of engine operating conditions.

Accordingly, as shown in table 600, during boost conditions intake air may be diverted through each of none, one, and both of first and second aspirators (e.g., aspirators A and B) based on the desired compressor bypass flow. This may include diverting intake air through none of the first and second aspirators if no compressor bypass flow is desired, diverting intake air through the first aspirator and not diverting intake air through the second aspirator if the desired compressor bypass flow is a first level, diverting intake air through the second aspirator and not diverting intake air through the first aspirator if the desired compressor bypass flow is a second level greater than the first level, and diverting intake air through both of the first and second aspirators if the desired compressor bypass flow is a third level greater than the second level. The desired level of compressor bypass flow may be based on a level of current or anticipated compressor surge, for example, whereas the desired vacuum generation may be based on a level of stored vacuum in a vacuum reservoir and/or based on a concentration of fuel vapor in a fuel vapor canister coupled with one or more suction passages of the first and second aspirators.

FIG. 7 depicts a table 700 relating the states of ASOVs A and B (e.g., ASOVs 91A and 91B of the first embodiment or ASOVs 391A and 391B of the second embodiment) with a corresponding level vacuum generation through aspirators A and B during non-boost operation. As noted in table 700, during non-boost conditions, compressor bypass flow level is not applicable as system pressures are such that motive flow through the aspirators travels from upstream of the compressor to downstream of the compressor. Although flow through the aspirators does in a sense bypass the idle compressor, this flow is not considered to be compressor bypass flow as the phrase is used herein in that it is not flow which provides compressor boost/surge regulation.

Like table 600, table 700 is directed to an embodiment such as the engine system depicted in FIG. 1 or FIG. 3 wherein the aspirators are asymmetrical and thus vacuum generation is greater for forward motive flow through each aspirator than for reverse motive flow through the aspirator. Further, like 600, table 700 is directed to an embodiment such as the engine system depicted in FIG. 1 or FIG. 3 wherein the motive inlets and mixed flow outlets of the aspirators are positioned such that the motive flow levels through the two aspirators are different during a given non-boost operating condition due to pressure differentials within the engine system.

During non-boost operation, the level of compressor bypass flow through aspirator A may be greater than the level of compressor bypass flow through aspirator B, because the pressure differential between the intake manifold and the intake passage upstream of the AIS throttle may be greater than the pressure differential between the intake passage upstream of the intake throttle and the intake passage intermediate the AIS throttle and compressor inlet when the compressor is not operating (e.g., depending on positions of the AIS throttle and main throttle). That is, for engine systems such as those depicted in FIGS. 1 and 3, the pressure differential across aspirator B is minimal when the compressor is not operating, whereas the pressure differential across aspirator A depends upon both AIS throttle position and main throttle position. While the pressure differential across aspirator A may be relatively small as well, for example during conditions where both the AIS throttle and main throttle are fully open, for the purposes of table 700 it will be assumed that the pressure differential across aspirator A is greater than the pressure differential across aspirator B during non-boost conditions, resulting in higher motive flow through aspirator A than through aspirator B.

As shown in the first row of table 700, a zeroth level of vacuum generation may be achieved by controlling both of ASOVs A and B to be in a closed state. In the depicted example, when both ASOVs are closed, no motive flow passes through the aspirators, and thus the level of vacuum generated during this condition is a zeroth level wherein no vacuum is generated.

The second row of table 700 corresponds to a first level of vacuum generation. The first level of vacuum generation may be achieved by controlling ASOV B to be in an open state and controlling ASOV A to be in a closed state. The first level of vacuum generation is greater than the zeroth level of vacuum generation in the depicted example. With ASOV B open and ASOV A closed, motive flow occurs through aspirator B but not through aspirator A. Because flow through aspirator B during non-boost conditions is reverse flow, in that the flow enters the mixed flow outlet and exits the motive inlet of the aspirator, the vacuum generation capabilities of aspirator B may not be maximized during such flow in examples where aspirator B is an asymmetrical aspirator, such as the aspirators in the depicted embodiments. Nonetheless, due to the venturi effect occurring at the throat of aspirator, some vacuum generation may still occur during reverse flow. The first level of vacuum generation may further depend upon various engine operating parameters which affect the pressure differential across aspirator B, such as AIS throttle position and any pressure reduction occurring in the intake between the points where the mixed flow outlet and motive inlet of aspirator B are coupled, e.g. pressure reduction due to the physical structures of components such as the idle compressor and the charge air cooler.

The third row of table 700 corresponds to a second level of vacuum generation. The second level of vacuum generation may be achieved by controlling ASOV A to be in an open state and controlling ASOV B to be in a closed state. With ASOV A open and ASOV B closed, motive flow occurs through aspirator A but not through aspirator B. The second level of vacuum generation may be greater than first level of vacuum generation discussed above. For example, as noted above, during non-boost operation the level of motive flow through aspirator A may be greater than the level of motive flow through aspirator B due to pressure differentials within the engine system. Further, in embodiments such as those depicted in FIGS. 1 and 3 where the aspirators are asymmetrical such that vacuum generation is maximized for forward flow and a lower level of vacuum generation (if any) occurs during reverse flow, more vacuum is generated when ASOV A alone is open versus when ASOV B alone is open, as forward flow occurs through aspirator A but not aspirator B during non-boost conditions.

The fourth row of table 700 corresponds to a third level of vacuum generation. The third level of vacuum generation may be achieved by controlling both ASOV A and ASOV B to be in an open state. With both ASOVs open, motive flow occurs through both aspirators. The third level of vacuum generation may be greater than the second level of vacuum generation discussed above. For example, depending on pressures within the engine system, the third level of vacuum generation may be equal to the sum of the first and second levels of vacuum generation (assuming all other engine operating parameters remain constant). The third level of vacuum generation may represent a maximum vacuum generation level achievable via the aspirators when boost is inactive, for a given set of engine operating conditions.

It will be appreciated that the exemplary compressor bypass flow and vacuum generation levels discussed above with reference to tables 600 and 700 pertain to engine system embodiments including aspirators with substantially equal cross-sectional flow areas. In examples where the two aspirators have different cross-sectional flow areas, and/or different geometries, the first, second, and third levels may have different relationships (e.g., the first level may not be less than the second level, etc.).

Accordingly, as shown in table 700, during non-boost conditions intake air may be diverted through each of none, one, and both of first and second aspirators (e.g., aspirators A and B) based on the desired vacuum generation. This may include diverting intake air through none of the first and second aspirators if no vacuum generation is desired, diverting intake air through the second aspirator and not diverting intake air through the first aspirator if the desired vacuum generation is a first level, diverting intake air through the first aspirator and not diverting intake air through the second aspirator if the desired vacuum generation is a second level greater than the first level, and diverting intake air through both of the first and second aspirators if the desired vacuum generation is a third level greater than the second level. The desired vacuum generation may be based on a level of stored vacuum in a vacuum reservoir and/or based on a concentration of fuel vapor in a fuel vapor canister coupled with one or more suction passages of the first and second aspirators, for example.

Figure 8:
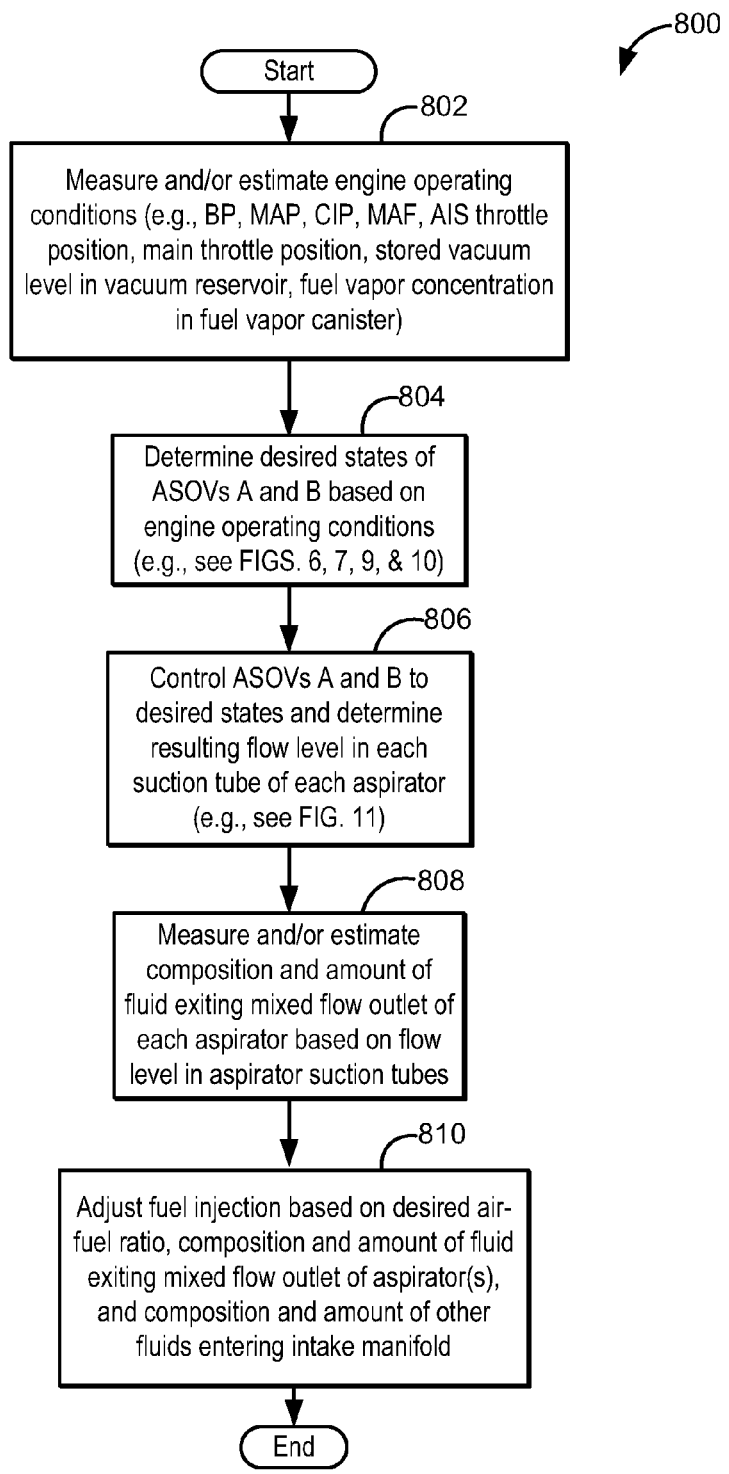
FIG. 8 shows an example method for controlling an engine system including first and second multiple tap aspirators, such as the engine system of FIG. 1 or 3.

Now referring to FIG. 8, an example method 800 for controlling an engine system including a multiple tap aspirator is provided. Method 800 may be used in conjunction with the engine systems and multiple tap aspirators depicted in FIGS. 1-4, and with the methods shown in FIGS. 9-11, for example.

At 802, method 800 includes measuring and/or estimating engine operating conditions. Engine operating conditions may include, for example, BP, MAP, CIP, MAF, AIS throttle position, main throttle position, stored vacuum level (e.g., in the vacuum reservoir), engine speed, engine temperature, catalyst temperature, boost level, ambient conditions (temperature, humidity.), fuel vapor concentration in the fuel vapor canister, etc.

After 802, method 800 proceeds to 804. At 804, method 800 includes determining desired states of ASOVs A and B based on engine operating conditions. For example, as shown in FIGS. 6 and 7, depending on the state of ASOVs A and B, different levels of compressor bypass flow and vacuum generation may be achieved (depending on whether boost is active or inactive). During non-boost conditions, the determination may be made in accordance with the method of FIG. 9, which will be described below. During boost conditions, the determination may be made in accordance with the method of FIG. 10, which will be described below.

After 804, method 800 proceeds to 806. At 806, method 800 includes controlling ASOVs A and B to the desired states determined at 804. Further, at 806, method 800 includes determining the flow level in each suction tube of the aspirator(s) which results from said control of the ASOVs, for example in accordance with the method of FIG. 11, which will be described below.

After 806, method 800 proceeds to 808. At 808, method 800 includes measuring and/or estimating the composition and/or amount of fluid exiting the mixed flow outlet of each aspirator. For example, the composition and amount of fluid exiting the mixed flow outlet of the aspirator may be estimated based on the flow levels in each suction tube of the aspirator determined at step 806 and further based on parameter values detected by various sensors. In the context of the first embodiment, where suction flow entering the exit tube taps of the aspirators includes some concentration of fuel vapors from the fuel vapor canister, the composition of the fluid exiting the mixed flow outlet of the aspirator may be based on the relative amounts of suction flow in the three suction taps (as determined at 806, for example) and based on an inference of fuel vapor concentration exiting the fuel vapor canister. The inference may be based on sensed exhaust gas composition, for example. Alternatively, dedicated sensors may be arranged in the suction passages coupled to the exit tube taps or elsewhere to directly measure the fuel vapor concentration entering the intake manifold from the fuel vapor purge system via the exit tube taps. In the context of the second embodiment, where all suction taps of the aspirators are coupled with the vacuum reservoir, the measurement/estimation of the composition of fluid exiting the mixed flow outlet of the aspirators may not be necessary as the composition may already be known, in which case step 808 may only include measuring and/or estimating the amount of fluid exiting the mixed flow outlet of each aspirator based on the flow level in the aspirator suction tubes.

It will be appreciated that depending on whether boost is active or inactive, the measurement and/or estimation of the composition and/or amount of fluid exiting the mixed flow outlet of each aspirator may be performed differently. For example, when boost is inactive, fluid flow through the aspirators travels from upstream of the compressor to downstream of the compressor and then into the intake manifold (depending on main throttle position for aspirator B). In contrast, when boost is active, fluid flow through the aspirators travels from downstream of the compressor to upstream of the compressor. Therefore, the control methodologies utilized by the controller to perform the measurements/estimates of step 808 may take into account where in the intake passage the fluid exiting the mixed flow outlet(s) of the aspirator(s) is delivered.

After 808, method 800 proceeds to 810. At 810, method 800 includes adjusting fuel injection based a desired engine air-fuel ratio, composition and/or amount of fluid exiting the mixed flow outlet of the aspirator(s) (e.g., as determined at 808), and composition and amount of any other fluids entering the intake manifold. For example, in embodiments where the flow exiting the mixed flow outlet(s) of the aspirator(s) includes fuel vapor purge gases, if the fuel vapor concentration of flow exiting the mixed flow outlet(s) of the aspirator(s) would result in a greater than desired proportion of fuel in the engine cylinders, fuel injection may be adjusted (e.g., decreased via decrease in pulse width of fuel injection or frequency of fuel injection) to achieve a desired engine air-fuel ratio. After 810, method 800 ends.

In accordance with method 800, motive flow through a first multiple tap aspirator (e.g., aspirator A) with a motive inlet coupled to an intake upstream of a compressor and a mixed flow outlet coupled to the intake downstream of the compressor and a second multiple tap aspirator (e.g., aspirator B) with a motive inlet coupled to the intake downstream of the compressor and a mixed flow outlet coupled to the intake upstream of the compressor may be adjusted based on engine operating conditions. Motive flow through the first aspirator may comprise adjusting a first aspirator shut-off valve (e.g., ASOV A) arranged in series with the motive inlet of the first aspirator, and wherein adjusting motive flow through the second aspirator comprises adjusting a second aspirator shut-off valve (e.g., ASOV B) arranged in series with the motive inlet of the second aspirator.

Figure 9:
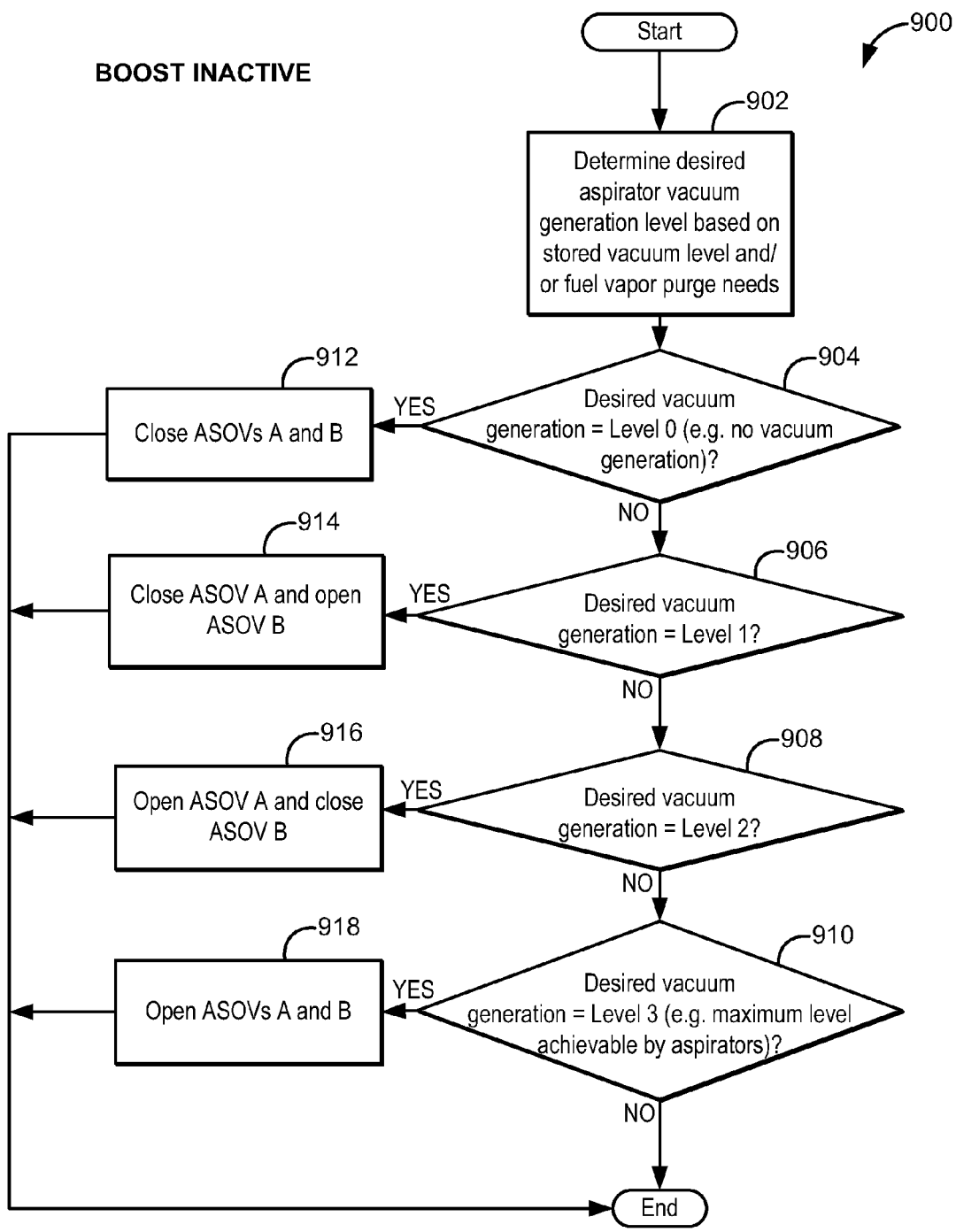
FIG. 9 shows an example method for determining desired states of aspirator shut-off valves of first and second multiple tap aspirators of an engine system such as the engine system of FIG. 1 or 3 during non-boost conditions.

In FIG. 9, an example method 900 is provided for determining desired states of ASOVs A and B when boost is inactive (e.g., when BP is greater than MAP). Method 900 may be performed at step 804 of FIG. 8 during non-boost conditions, for example.

At 902, method 900 includes determining the desired level of aspirator vacuum generation based on stored vacuum level and/or fuel vapor purge needs. For example, in the context of the first embodiment, fluid flow through the aspirators generates vacuum at the vacuum reservoir as well as the fuel vapor purge system. Accordingly, determining the desired level of aspirator vacuum generation in the context of the first embodiment may include determining whether a stored vacuum level in the vacuum reservoir (e.g., as indicated by a signal from sensor 40 of FIG. 1) is greater than a threshold, and/or whether the fuel vapors need to be purged from the fuel vapor canister (e.g., as may be inferred based on sensed parameter values including fuel vapor canister pressure sensed by sensor 49 of FIG. 1). In contrast, in the context of the second embodiment wherein all aspirator suction taps are coupled with the vacuum reservoir, determining the desired level of aspirator vacuum generation may be based on system vacuum needs such as stored vacuum level in the vacuum reservoir, current vacuum requests (e.g., based on brake pedal position), MAP (e.g., as sensed by sensor 60 of FIG. 1), etc., and fuel vapor purge needs may be irrelevant. After 902, method 900 proceeds to 904.

It will be appreciated that the desired level of vacuum generation may take into account the engine system's tolerance for extra throttle bypass flow occurring through the aspirator(s). For example, during conditions where extra throttle bypass flow is not permissible (e.g., due to a driver torque request), the controller may reduce the desired level of vacuum generation accordingly. However, intolerance for extra throttle bypass flow may not generally be an issue, because during conditions when the system cannot tolerate extra throttle bypass flow rate there is typically adequate intake manifold vacuum available (and thus the desired vacuum generation during such conditions may be low due to the availability of intake manifold vacuum).

At 904, method 900 includes determining whether the desired level of aspirator vacuum generation is a zeroth level (e.g., Level 0 of FIG. 7), which may correspond to no vacuum generation as discussed above with reference to FIG. 7. If the answer at 904 is YES, method 900 proceeds to 912 to close both ASOVs, such that no motive flow is permitted through both aspirators and thus no vacuum is generated via the aspirators. The zeroth level may be desired during high load/high speed conditions, for example, when diversion of intake airflow through the aspirator(s) may reduce the engine's ability to quickly ramp up to a requested load or speed.

Closing and opening the ASOVs may be an active process in embodiments where the ASOVs are solenoid valves (e.g., the ASOVs may be controlled by a controller such as controller 50 of FIG. 1). Alternatively, in embodiments where the ASOVs are passive valves such as vacuum-actuated valves, each ASOV may be coupled to a vacuum source and may be opened/closed based on a vacuum level at the vacuum source. Further, if the ASOVs are already both closed when step 912 is performed, closing the ASOVs may include taking no action. Similarly, in subsequent steps which will be described below, opening or closing an ASOV which is already open or closed, respectively, may including taking no action. After 912, method 900 ends.

Otherwise, if the answer at 904 is NO, method 900 proceeds to 906. At 906, method 900 includes determining whether the desired level of aspirator vacuum generation is a first level (e.g., Level 1 of FIG. 7). As described above with respect to FIG. 7, the first level may be greater than the zeroth level and less than a second level which will be described below. If the answer at 906 is YES, method 900 proceeds to 914 to close ASOV A and open ASOV B. After 914, method 900 ends.

Alternatively, if the answer at 906 is NO, method 900 proceeds to 908. At 908, method 900 includes determining whether the desired level of aspirator vacuum generation is a second level (e.g., Level 2 of FIG. 7). As described above with respect to FIG. 7, the second level may be greater than the first level and less than a third level which will be described below. If the answer at 908 is YES, method 900 proceeds to 916 to open ASOV A and close ASOV B. After 916, method 900 ends.

However, if the answer at 908 is NO, method 900 continues to 910. At 910, method 900 includes determining whether the desired level of aspirator vacuum generation is a third level (e.g., Level 3 of FIG. 7), which may correspond to a maximum level of vacuum generation achievable via the aspirators for a given set of engine operating conditions. If the answer at 910 is YES, method 900 proceeds to 918 to open both ASOV A and ASOV B. After 918, method 900 ends.

In accordance with method 900, during non-boost conditions, first and second aspirator shut-off valves (e.g., ASOVs A and B) may be adjusted based on desired vacuum generation and based on a fuel vapor concentration in a fuel vapor canister coupled to one or more suction taps of one or more of the first and second aspirators (e.g., aspirators A and B). Further, the adjusting of the first and second aspirator shut-off valves may comprise adjusting a combined motive flow through the first and second aspirators to one of a plurality of discrete motive flow levels (e.g., Levels 0-3) by opening or closing each of the aspirator shut-off valves.

Figure 10:
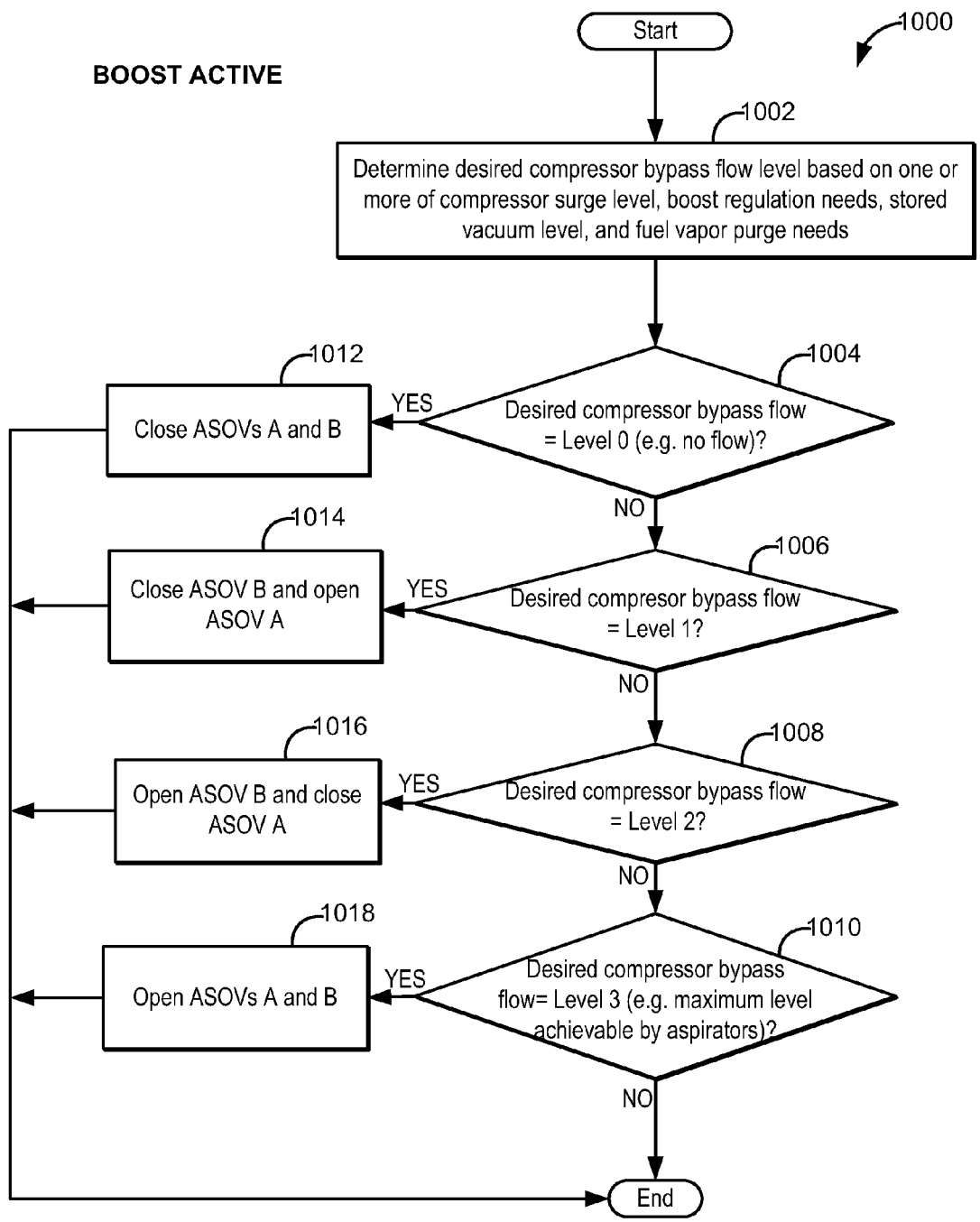
FIG. 10 shows an example method for determining desired states of aspirator shut-off valves of first and second multiple tap aspirators of an engine system such as the engine system of FIG. 1 or 3 during boost conditions.

In FIG. 10, an example method 1000 is provided for determining desired states of ASOVs A and B when boost is active (e.g., when BP is less than MAP). Method 1000 may be performed at step 804 of FIG. 8 during boost conditions, for example.

At 1002, method 1000 includes determining the desired level of compressor bypass flow. For example, the desired level of compressor bypass flow may be based on one or more of compressor surge level (e.g., as indicated by sensed pressure values upstream and downstream of the compressor), compressor boost regulation need (e.g., a need for compressor recirculation to reduce a possibility of compressor surge developing), stored vacuum level, and fuel vapor purge needs. As in method 900, fuel vapor purge needs may be a consideration in the context of the first embodiment (wherein some of the suction taps of the aspirators are coupled with the fuel vapor purge system) but not the second embodiment (wherein all suction taps of the aspirators are coupled with the vacuum reservoir). Fuel vapor purge needs may include vacuum requests from the fuel vapor purge system, which may be based on a fuel vapor concentration in the fuel vapor canister.

It will be appreciated that compressor bypass flow corresponds to motive flow through the aspirator(s) during boost conditions; as such, compressor bypass flow level may be directly proportional to vacuum generation level, such that higher compressor bypass flow results in higher vacuum generation (where the phrase compressor bypass flow as used herein does not include any recirculation flow through a dedicated compressor recirculation passage such as passage 28 of FIG. 1). Because of this correlation between vacuum generation and compressor bypass flow, it may be necessary for the control system to arbitrate between the system's need for vacuum generation and the system's tolerance for loss of boost during a given set of operating conditions. For example, during hard acceleration when boost is initially building, it may not be desirable to direct compressor bypass flow through the aspirator(s), as the system may not be able to tolerate loss of boost during such conditions. Accordingly, during such conditions, it may not be advisable to direct flow through the aspirator(s) even if vacuum generation is desired. However, once boost has increased above a target level which is a level at which compressor bypass flow is permissible, compressor bypass flow—and thus vacuum generation—may occur via the aspirator(s). As vacuum generation replenishment via the aspirator(s) may only be required to replenish the brake booster, and then may not be needed until the next brake use, these constraints on operation of the aspirators during boost conditions may not be problematic.

After 1002, method 1000 proceeds to 1004. At 1004, method 1000 includes determining whether the desired level of compressor bypass flow and vacuum generation is a zeroth level (e.g., Level 0 of FIG. 6), which may correspond to no compressor bypass flow and no vacuum generation as discussed above with reference to FIG. 6. If the answer at 1004 is YES, method 1000 proceeds to 1012 to close both ASOVs, such that no compressor bypass flow is permitted through both aspirators and thus no vacuum is generated via the aspirators. After 1012, method 1000 ends.

Otherwise, if the answer at 1004 is NO, method 1000 proceeds to 1006. At 1006, method 1000 includes determining whether the desired level of compressor bypass flow and vacuum generation is a first level (e.g., Level 1 of FIG. 6). As described above with respect to FIG. 6, the first level may be greater than the zeroth level and less than a second level which will be described below. If the answer at 1006 is YES, method 1000 proceeds to 1014 to close ASOV B and open ASOV A. After 1014, method 1000 ends.

Alternatively, if the answer at 1006 is NO, method 1000 proceeds to 1008. At 1008, method 1000 includes determining whether the desired level of compressor bypass flow and vacuum generation is a second level (e.g., Level 2 of FIG. 6). As described above with respect to FIG. 6, the second level may be greater than the first level and less than a third level which will be described below. If the answer at 1008 is YES, method 1000 proceeds to 1016 to open ASOV B and close ASOV A. After 1016, method 1000 ends.

However, if the answer at 1008 is NO, method 1000 continues to 1010. At 1010, method 900 includes determining whether the desired level of compressor bypass flow and vacuum generation is a third level (e.g., Level 3 of FIG. 6), which may correspond to a maximum level of compressor bypass flow and vacuum generation achievable via the aspirators for a given set of engine operating conditions. The third level may be appropriate when compressor surge is relatively high, for example, and/or when vacuum generation is urgently needed. If the answer at 1010 is YES, method 1000 proceeds to 1018 to open both ASOV A and ASOV B. After 1018, method 1000 ends.

In accordance with method 1000, during boost conditions, first and second aspirator shut-off valves (e.g., ASOVs A and B) may be adjusted based on desired compressor bypass flow, desired vacuum generation, and optionally based on fuel vapor concentration in a fuel vapor canister coupled to one or more suction taps of one or more of the first and second aspirators (e.g., aspirators A and B). When vacuum generation is not needed, the ASOVs may be controlled in the same way that a traditional CBV would be controlled (e.g., the ASOVs may be controlled to achieve a desired level of compressor bypass flow). Further, the adjusting of the first and second aspirator shut-off valves may comprise adjusting a combined motive flow through the first and second aspirators to one of a plurality of discrete motive flow levels (e.g., Levels 0-3) by opening or closing each of the aspirator shut-off valves.

Figure 11:
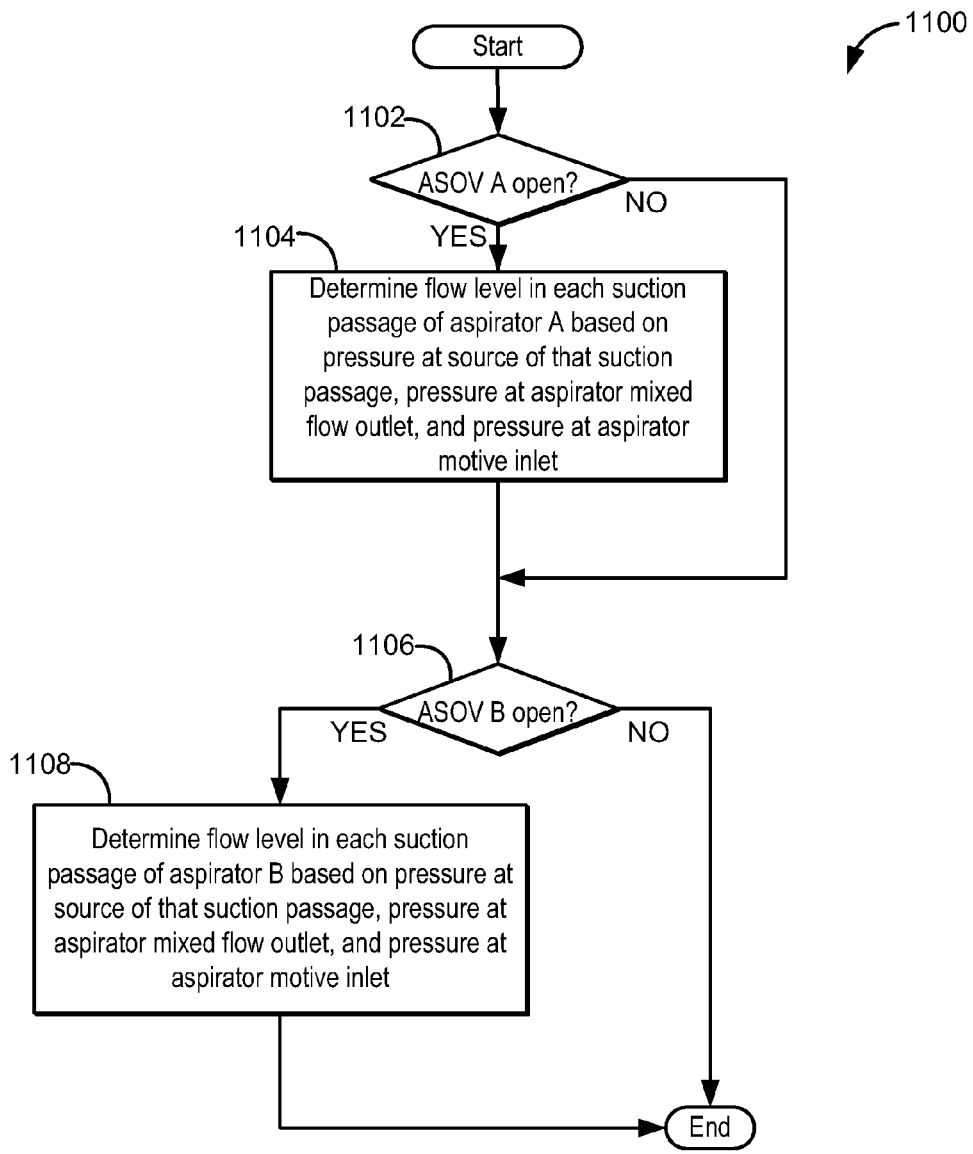
FIG. 11 shows an example method for determining the flow level in each suction tube of a first and/or second multiple tap aspirator, in the context of an engine system such as the engine system of FIG. 1 or 3.

Now referring to FIG. 11, an example method 1100 is provided for determining the flow level in each suction tube of aspirator A and/or aspirator B. Method 1100 may be performed at step 806 of method 800, for example, during either boost conditions or non-boost conditions.

At 1102, if ASOV A is open, method 1100 proceeds to 1104 to determine the flow level in each suction passage of aspirator A based on the pressure at the source of that suction passage (e.g., the vacuum reservoir and/or fuel vapor purge system), the pressure at the aspirator's mixed flow outlet (e.g., the intake manifold during non-boost conditions and the intake passage upstream of the AIS throttle during boost conditions), and the pressure at the aspirator's motive inlet (e.g., the intake passage upstream of the AIS throttle during non-boost conditions and the intake manifold during boost conditions). These pressures may be measured and/or estimated based on signals from various sensors within the engine system such as sensors 41, 44, and 60. The amount of suction flow occurring via a given suction passage of aspirator A, if any, at a given time during engine operation may be a function of the level of motive flow through the aspirator (which is a function of the pressures at the mixed flow outlet and motive inlet of the aspirator), the geometry of the aspirator (e.g., the cross-sectional flow area of the aspirator and the various suction taps of the aspirator, the placement of the suction taps, the cross-sectional flow area of the suction passages coupled to the aspirator suction taps, and any other structural features of the aspirator affecting motive and suction flow), and the relative pressures at the source(s) and sink(s) of the suction passages. For example, in the context of the first engine system embodiment described herein, the exit tube tap of aspirator A is coupled to a fuel vapor purge system at its source. During non-boost conditions, because the mixed flow outlet of aspirator A is coupled to the intake manifold, the pressure differential between the fuel vapor purge system (e.g., the fuel vapor purge canister) and the intake manifold may factor into the determination of the flow level in the exit tube suction passage during such conditions. As one example, when the pressure in the fuel vapor canister is higher than the pressure in the intake manifold (e.g., when a negative pressure or vacuum level in the fuel vapor canister is lower than a negative pressure or vacuum level in the intake manifold) during non-boost conditions, fluid may flow from the fuel vapor canister into the exit tube of aspirator A, and then to the intake manifold. While fluid may flow into all three suction taps of aspirator A during these conditions, the exit tube suction passage may dominate (e.g., substantially more suction flow may enter via the exit tube tap relative to the suction flow entering via the throat and diverging cone taps). When the pressure in the fuel vapor canister decreases to a level lower than a pressure level in the intake manifold, however, the check valve in the suction passage coupled to the exit tube tap closes, and flow in the suction passage ceases (e.g., to prevent backflow from the intake manifold to the fuel vapor canister). In contrast, in the context of the engine system of the second engine system embodiment described herein, wherein all of the aspirator taps are coupled to a common vacuum reservoir, the source of the exit tube suction passage is the vacuum reservoir, and thus the pressure differential between the vacuum reservoir and the sink of aspirator A (e.g. the intake manifold during non-boost conditions and the intake passage upstream of the AIS throttle during boost conditions), may factor into the determination of the flow level in the exit tube suction passage of aspirator A. As noted above, exemplary flow rates through the exit tube suction passage of an aspirator such as aspirator A over a range of vacuum reservoir vacuum levels (in the context of the second embodiment) are depicted by characteristic 502 of FIG. 5 for a vacuum level of 15 kPa at the aspirator's mixed flow outlet. Determination of the flow level in the throat suction passage and diverging cone suction passage may be performed in a similar manner, e.g. based on pressures at the source of each passage and based on pressures at the motive inlet and mixed flow outlet of the aspirator. Exemplary flow rates through the diverging cone suction passage and throat suction passage of an aspirator such as aspirator A over a range of vacuum reservoir vacuums (in the context of the second embodiment) are depicted by characteristics 504 and 506 of FIG. 5, respectively, for an intake manifold vacuum level of 15 kPa.

After 1104, method 1100 proceeds to 1106 to determine whether ASOV B is open. If ASOV B is not open, method 1100 ends; in this case, the determination of the flow level in each suction passage of aspirator A is adequate as no suction flow occurs in the suction passages of aspirator B when ASOV B is closed. Otherwise, if ASOV B is determined to be open, method 1100 proceeds to 1108.

At 1108, the flow level in each suction passage of aspirator B is determined based on the pressure at the source of that suction passage (e.g., the vacuum reservoir and/or fuel vapor purge system), the pressure at the aspirator's mixed flow outlet (e.g., upstream of the main throttle during non-boost conditions and the compressor inlet during boost conditions), and the pressure at the aspirator's motive inlet (e.g., the compressor inlet during non-boost conditions and upstream of the main throttle during boost conditions). This determination may be made in a similar manner to the determination performed in step 1104 which is described above. After 1108, method 1100 ends.

Accordingly, FIG. 11 provides a method for determining a flow level in each of a suction tap in a throat of a first aspirator (e.g., aspirator A), a suction tap in a diverging cone of the first aspirator, and a suction tap in a straight tube downstream of the diverging cone of the first aspirator, and determining a flow level in each of a suction tap in a throat of the second aspirator (e.g., aspirator B), a suction tap in a diverging cone of the second aspirator, and a suction tap in a straight tube downstream of the diverging cone of the second aspirator. The control system may then use these flow levels at step 808 of method 800 to measure and/or estimate a composition and amount of fluid exiting the mixed flow outlet of each aspirator (such that fuel injection may be adjusted based on a desired engine air-fuel ratio and the composition and amount of fluid exiting the mixed flow outlets of the first and second aspirators).

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
    selectably diverting intake air around a compressor and through first and second aspirators each comprising a suction tap in a throat, a suction tap in a diverging cone, and a suction tap in a straight tube downstream of the diverging cone, based on desired vacuum generation during non-boost conditions and based on desired compressor bypass flow during boost conditions,
    during non-boost conditions, diverting intake air through each of none, one, and both of the first and second aspirators based on the desired vacuum generation, diverting intake air through none of the first and second aspirators if no vacuum generation is desired, diverting intake air through the second aspirator and not diverting intake air through the first aspirator if the desired vacuum generation is a first level, diverting intake air through the first aspirator and not diverting intake air through the second aspirator if the desired vacuum generation is a second level greater than the first level, and diverting intake air through both of the first and second aspirators if the desired vacuum generation is a third level greater than the second level, and during boost conditions, diverting intake air through each of none, one, and both of the first and second aspirators based on the desired compressor bypass flow, diverting intake air through none of the first and second aspirators if no compressor bypass flow is desired, diverting intake air through the first aspirator and not diverting intake air through the second aspirator if the desired compressor bypass flow is a first level, diverting intake air through the second aspirator and not diverting intake air through the first aspirator if the desired compressor bypass flow is a second level greater than the first level, and diverting intake air through both of the first and second aspirators if the desired compressor bypass flow is a third level greater than the second level.

2. The method of claim 1, wherein diverting intake air through the first aspirator comprises opening a first aspirator shut-off valve arranged in series with a motive inlet of the first aspirator and communicating with an engine intake upstream of an air induction system throttle, and wherein diverting intake air through the second aspirator comprises opening a second aspirator shut-off valve arranged in series with a motive inlet of the second aspirator and communicating with the intake upstream of a main throttle.

3. The method of claim 1, further comprising determining the desired level of vacuum generation based on a level of stored vacuum in a vacuum reservoir and determining the desired level of compressor bypass flow based on a level of current or anticipated compressor surge.

4. The method of claim 3, further comprising determining the desired level of vacuum generation based on a concentration of fuel vapor in a fuel vapor canister coupled with one or more of the suction taps of the first and second aspirators.

5. A method for an engine, comprising:
selectable diverting intake air around a compressor and through first and second aspirators each comprising a suction tap in a throat, a suction tap in a diverging cone, and a suction tap in a straight tube downstream of the diverging cone, based on desired vacuum generation during non-boost conditions and based on desired compressor bypass flow during boost conditions, during non-boost conditions, diverting intake air through each of none, one, and both of the first and second aspirators based on the desired vacuum generation, wherein diverting intake air through the first aspirator during non-boost conditions further comprises diverting intake air from an intake upstream of an air induction system throttle to an engine intake manifold, and wherein diverting intake air through the second aspirator during non-boost conditions further comprises diverting intake air from downstream of the air induction system throttle to the intake upstream of a main intake throttle, and during boost conditions, diverting intake air through each of none, one, and both of the first and second aspirators based on the desired compressor bypass flow, wherein diverting intake air through the first aspirator during boost conditions further comprises diverting intake air from the intake manifold to the intake upstream of the air induction system throttle, and wherein diverting intake air through the second aspirator during boost conditions further comprises diverting intake air from the intake upstream of the main throttle to the intake downstream of the air induction system throttle.

6. A method for an engine, comprising:
selectably diverting intake air around a compressor and through first and second aspirators each comprising a suction tap in a throat, a suction tap in a diverging cone, and a suction tap in a straight tube downstream of the diverging cone, based on desired vacuum generation during non-boost conditions and based on desired compressor bypass flow during boost conditions, where the first aspirator is fluidically coupled with an engine intake upstream of an air induction system throttle, and the second aspirator is fluidically coupled to the engine intake downstream of the air induction system throttle and upstream of the compressor, the compressor being downstream of the air induction system throttle.

7. The method of claim 6, wherein the second aspirator is fluidically coupled to the engine intake upstream of a main throttle, the main throttle being downstream of the compressor.

* * * * *

UNITED STATES PATENT AND TRADEMARK OFFICE
CERTIFICATE OF CORRECTION

PATENT NO. : 9,631,587 B2  
APPLICATION NO. : 15/170047  
DATED : April 25, 2017  
INVENTOR(S) : Ross Dykstra Pursifull It is certified that error appears in the above-identified patent and that said Letters Patent is hereby corrected as shown below:

In the Claims

Column 27, Line 38, Claim 5, "selectable" should read "selectably".

Signed and Sealed this
Fourth Day of July, 2017

Joseph Matal
*Performing the Functions and Duties of the*
*Under Secretary of Commerce for Intellectual Property and*
*Director of the United States Patent and Trademark Office*